(12) United States Patent
Rostami et al.

(10) Patent No.: US 10,038,514 B2
(45) Date of Patent: Jul. 31, 2018

(54) DATACENTRE FOR PROCESSING A SERVICE

(71) Applicant: Telefonaktiebolaget LM Ericsson (publ), Stockholm (SE)

(72) Inventors: Ahmad Rostami, Solna (SE); Björn Skubic, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/522,065

(22) PCT Filed: Dec. 23, 2014

(86) PCT No.: PCT/SE2014/051572
§ 371 (c)(1),
(2) Date: Apr. 26, 2017

(87) PCT Pub. No.: WO2016/105257
PCT Pub. Date: Jun. 30, 2016

(65) Prior Publication Data
US 2017/0331578 A1  Nov. 16, 2017

(51) Int. Cl.
*H04J 14/02* (2006.01)
*H04Q 11/00* (2006.01)

(52) U.S. Cl.
CPC ...... *H04J 14/0213* (2013.01); *H04J 14/0206* (2013.01); *H04J 14/0212* (2013.01); *H04Q 2011/0016* (2013.01)

(58) Field of Classification Search
CPC .............. H04J 14/0213; H04J 14/0206; H04J 14/0212; H04Q 2011/0016
See application file for complete search history.

(56) References Cited

U.S. PATENT DOCUMENTS 9,800,959 B2 * 10/2017 Zhang ................. H04Q 11/0005
2006/0210266 A1 * 9/2006 Aoki ................... H04Q 11/0005
398/19

(Continued)

FOREIGN PATENT DOCUMENTS

WO   2013171042 A1   11/2013

OTHER PUBLICATIONS

Xia, Ming et al., "SDN and Optical Flow Steering for Network Function Virtualization," Open Networking Summit (ONS), Extended Abstract, Mar. 2-4, 2014, Santa Clara, California, USENIX, 2 pages.

(Continued)

*Primary Examiner* — Shi K Li
*Assistant Examiner* — Mina Shalaby
(74) *Attorney, Agent, or Firm* — Withrow & Terranova, PLLC

(57) ABSTRACT

A datacenter for performing a service is provided. The datacenter is configured for receiving an optical signal comprising groups of wavelength bands, A1, A2, A3, . . . , AX, and B, X being an integer, the signal being associated with a request for a service to be executed by the datacenter, the datacenter being configured for executing the service and outputting the result of the service. The datacenter comprises at least one 1:N MD-WSS, having one common port and N tributary ports, where N is an integer and N>1, and a group of at least one server cluster, each comprising a respective transceiver configured to receive and transmit signals on at least some of the wavelength bands.

14 Claims, 8 Drawing Sheets

(56) References Cited

U.S. PATENT DOCUMENTS

| | | |
|---|---|---|
| 2012/0008945 A1 | 1/2012 | Singla et al. |
| 2014/0105600 A1* | 4/2014 | Dahlfort ............. H04J 14/0204 398/48 |
| 2014/0119728 A1 | 5/2014 | Ihang et al. |
| 2015/0104170 A1* | 4/2015 | Xia ..................... H04J 14/0202 398/48 |
| 2015/0215066 A1* | 7/2015 | Testa .................. H04J 14/0212 398/48 |

OTHER PUBLICATIONS

International Preliminary Report on Patentability for International Patent Application No. PCT/SE2014/051572, dated Jul. 6, 2017, 8 pages.

Chen, Kai et al., "OSA: An Optical Switching Architecture for Data Center Networks with Unprecedented Flexibility," IEEE/ACM Transactions on Networking (TON), vol. 22, Issue 2, Apr. 1, 2014, IEEE, pp. 498-511.

Kachris, Christoforos et al., "A Survey on Optical Interconnects for Data Centers," IEEE Communications Surveys & Tutorials, vol. 14, Issue 4, Fourth Quarter, Jan. 11, 2012, IEEE, pp. 1021-1036.

Srinivas, Raksha et al., "Virtual Network Embedding in Hybrid Datacenters with Dynamic Wavelength Grouping," IEEE 6th International Conference on Cloud Computing Technology and Science (CloudCom), Dec. 15-18, 2014, IEEE, 7 pages.

International Search Report and Written Opinion for International Patent Application No. PCT/SE2014/051572, dated Jul. 20, 2015, 10 pages.

\* cited by examiner

DATACENTRE FOR PROCESSING A SERVICE

This application is a 35 U.S.C. § 371 national phase filing of International Application No. PCT/SE2014/051572, filed Dec. 23, 2014, the disclosure of which is incorporated herein by reference in its entirety.

TECHNICAL FIELD

The present disclosure relates to datacentres and in particular to a datacentre configured for processing a service.

BACKGROUND

Datacentre networking has recently been receiving an ever-increasing amount of attention, among other things due to the introduction of new approaches to creating telecom services, namely Dynamic Service Chaining, DSC, and the corresponding enabling technologies like Network Function Virtualisation, NFV. Specifically, virtualising network functions in the software and running them on generalised hardware platforms may bring additional degree of flexibility in service provisioning and control, where a network function can dynamically be provisioned, modified (e.g. up and down-scaling), migrated and terminated. This enables service providers to push most of the building blocks of the services into datacentres, where they can dynamically instantiate a specific set of functions, pipe them together and offer a new service in a short amount of time.

A major requirement of an NFV infrastructure (e.g. a datacentre) is the ability to dynamically steer the traffic between several virtualised network functions (VNFs)—running on potentially different servers—back and forth. This dynamicity puts additional constraints on the forwarding and control architectures of the datacentre networks. Specifically, in a datacentre utilised as an NFV infrastructure there is a need for flexible, fast and cost-efficient transport architecture both between datacentre in/output and the servers as well as among servers themselves. An additional requirement here, making the task even more challenging, is the large capacity requirement in particular for aggregate services. Meeting all these requirements is a quite challenging task in conventional datacentres, which typically contain thousands of hierarchically structured switches and routers.

SUMMARY

The object is to obviate at least some of the problems outlined above. In particular, it is an object to provide a datacentre for performing a service. This object and others may be obtained by providing a datacentre according to the independent claims attached below.

According to an aspect a datacentre for performing a service is provided. The datacentre is configured for receiving an optical signal comprising groups of wavelength bands, A1, A2, A3, . . . , AX, and B, X being an integer, the signal being associated with a request for a service to be executed by the datacentre, the datacentre being configured for executing the service and outputting the result of the service. The datacentre comprises at least one 1:N MD-WSS having one common port and N tributary ports, where N is an integer and N>1.

The datacentre further comprises a group of at least one server cluster each comprising a respective transceiver configured to receive and transmit signals on at least some of the wavelength bands.

The at least one MD-WSS is configured to receive the signal associated with the service on its common port and to output a part of the signal that comprises a first A-group of wavelengths, i.e. A1, A2, A3, etc., on an output tributary port for wavelengths of the first A-group towards the group of server clusters.

The transceiver of one of the server clusters is configured to receive the signal from the at least one MD-WSS, wherein the server cluster is configured to perform at least a part of the requested service, wherein the transceiver is further configured to output a signal towards one of the at least one MD-WSS the signal outputted from the transceiver having a wavelength of group B of wavelengths when at least one part of the service remains to be executed before the service is fully executed, and the signal outputted from the transceiver having a wavelength of a second A-group of wavelengths, i.e. A1, A2, A3, etc., when the service is fully executed, wherein the first and the second A-group of wavelengths are different.

Further, one of the at least one MD-WSS is configured to receive the signal from the transceiver on an input tributary port for wavelengths of the second A-group and group B, and to (i) when the signal has a wavelength of the group B: output the signal on an output tributary port for wavelengths of group B towards the server clusters, wherein the output tributary port for wavelengths of group B is the same as the output tributary port for wavelengths of the first A-group and to (ii) when the signal has the wavelength of the second A-group: output the signal on the common port.

The datacentre has several possible advantages. An advantage is that the data plane architecture is relatively simple, comprising relatively few MD-WSS compared to datacentres comprising regular WSSs. Another advantage is that the control plane and signalling may be relatively simple since the number of data-plane devices to be controlled may be limited to few ones, making the design of the control and signalling less complex. Still an advantage is simplicity of network management due to the above reasons, i.e. simple network architecture, the management mechanisms like configuration, performance management, fault detection and recovery, etc. can be realised relatively easily. Yet an advantage is that the datacentre provides support for dynamic capacity provisioning among different server clusters, but it also provides flexibility in dynamically sharing the total transport capacity between intra-datacentre communications and datacentre I/O traffic. A further advantage is scalability since in the proposed architecture neither the number of MD-WSSs nor the number of ports per MD-WSS needs to scale with the number of server clusters. Yet an advantage is low cost, both capital and operational wise.

BRIEF DESCRIPTION OF DRAWINGS

Embodiments will now be described in more detail in relation to the accompanying drawings, in which.

DETAILED DESCRIPTION

Briefly described, a datacentre is provided for performing a service, wherein at least one server cluster of the datacentre is configured to execute the service. The datacentre comprises novel networking architectures and associated configurations, which are based on optical networking technologies. The proposed datacentre and architectures specifically target datacentre environments for NFV and DSC applications, where high levels of flexibility, dynamicity and capacity are among the main requirements of the datacentre networking part. The presented architectures may employ a limited number of Multi Directional Wavelength Selective Switch, WSSs, optical splitters, combiners and tunable interfaces in a flexible and scalable manner. The embodiments of the datacentre make use of the multidirectional wavelength routing capability of MD-WSS(s)

Existing approaches to building datacentre networks are mostly based on hierarchical switches and routers (primarily layer 2 Ethernet switches), which suffer from several problems. First and foremost, the existing architectures are quite complex, as they involve a huge number of interconnected devices. An immediate consequence is the lack of flexibility and the complexity of dynamic control (e.g. dynamic routing and traffic steering) as well as network management (e.g. consistent configuration, fault detection and recovery). These shortcomings collectively lead to a high cost of the existing approaches (both capital and operational costs), in particular for NFV applications with higher throughput requirements.

Some solutions for datacentre networking are based on optical networking technologies. Parts of such solution are based on fine-grain optical switching technologies, such as optical packet/burst switching, which might theoretically provide the required flexibility, but are far from being feasible in the foreseeable future due to immaturity of required optical technologies and excessive costs, among other issues. The other part of optical solutions is usually based on optical circuit switching technologies. A major concern in such architectures is to provide a flexible and scalable transport with limited number of optical devices.

Embodiments herein relate to a datacentre, e.g. for Network Function Virtualisation, NFV, comprising at least one 1:N Multi Directional Wavelength Selective Switch, MD-WSS. Exemplifying embodiments of such a datacentre will now be described with reference to FIGS. 1a-1f.

Figure 1A:
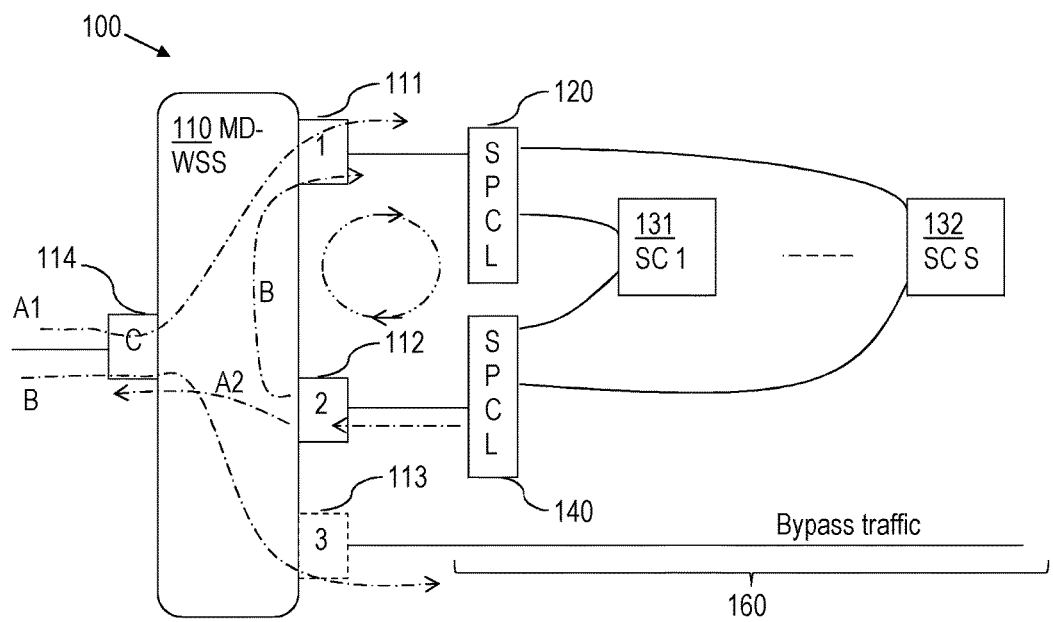
FIG. 1a is an illustration of a datacentre and the architecture thereof according to an exemplifying embodiment.

FIG. 1a illustrates an exemplifying embodiment of the datacentre 100, which is configured for receiving an optical signal comprising groups of wavelength bands, A1, A2, A3, . . . , AX, and B, X being an integer, the signal being associated with a request for a service to be executed by the datacentre, wherein the datacentre is configured for executing the service and outputting the result of the service.

The datacentre 100 comprises at least one 1:N MD-WSS 110 having one common port 114 and N tributary ports 111, 112 and 113, where N is an integer and N>1, i.e. 3 in FIG. 1a.

The datacentre 100 further comprises a group 160 of at least one server cluster 131, 132, each comprising a respective transceiver configured to receive and transmit signals on at least some of the wavelength bands.

The at least one MD-WSS 110 is configured to receive the signal associated with the service on its common port 114 and to output a part of the signal that comprises a first A-group of wavelengths, i.e. A1, A2, A3, etc., on an output tributary port 111 for wavelengths of the first A-group towards the group 160 of server clusters 131, 132.

The transceiver of one of the server clusters is configured to receive the signal from the at least one MD-WSS 110, wherein the server cluster is configured to perform at least a part of the requested service, wherein the transceiver is further configured to output a signal towards one of the at least one MD-WSS 110 the signal outputted from the transceiver having a wavelength of group B of wavelengths when at least one part of the service remains to be executed before the service is fully executed, and the signal outputted from the transceiver having a wavelength of a second A-group of wavelengths, i.e. A1, A2, A3, etc., when the service is fully executed, wherein the first and the second A-group of wavelengths are different.

Further, one of the at least one MD-WSS 110 is configured to receive the signal from the transceiver on an input tributary port 112 for wavelengths of the second A-group and group B, and to (i) when the signal has a wavelength of the group B: output the signal on an output tributary port 111 for wavelengths of group B towards the server clusters 131, 132, wherein the output tributary port for wavelengths of group B is the same as the output tributary port 111 for wavelengths of the first A-group and to (ii) when the signal has the wavelength of the second A-group: output the signal on the common port 114.

The MD-WSS 110 in FIG. 1a is illustrated having one common port 114 and three tributary ports, 111, 112 and 113. As stated above, the datacentre comprises at least one MD-WSS and any MD-WSS in the datacentre has at least two tributary ports. Thus the illustrated exemplified embodiment of FIG. 1a is almost a "minimum" example since the datacentre only has one MD-WSS 110 and the MD-WSS has three (two being the minimum) tributary ports 111-113. Further, the datacentre 100 in FIG. 1a comprises a number of server clusters whereof two are illustrated with reference numbers 131 and 132. The server clusters constitutes a group 160 of server clusters.

The MD-WSS comprises a reflective element and at least two tributary ports, a first and a second tributary port, wherein the MD-WSS is adapted to switch an optical signal between the first tributary port and the second tributary port. Consequently, an optical signal received on one of the tributary port may be outputted on the other tributary port by means of the reflective element. As will be described below, the MD-WSS may comprise more than two tributary ports, wherein the MD-WSS is configured to switch optical signals between the different ports by means of the reflective element depending on the incoming wavelength of the signal that is received on one of the tributary ports of the MD-WSS.

FIG. 1a illustrates that the datacentre 100 is configured to receive an optical signal by means of the common port 114 of the MD-WSS 110. The signal may comprise a plurality of different wavelengths, which in turn may belong to different groups of wavelength bands. One group of wavelength bands is called group B and there may be a plurality of A-groups of wavelength bands called group A1, A2, A3, etc. up to AX, where X is an integer.

When the optical signal that is received by the datacentre 100 by means of the common port 114 of the MD-WSS 110 comprises wavelengths of the first A-group which is denoted A1 in FIG. 1a, the MD-WSS is configured to output those wavelengths on the output tributary port 111 for wavelengths of the first A-group, also referred to as A1 wavelength(s) with reference to FIG. 1a. The A1 wavelengths of the received optical signal are outputted towards the group 160 of server clusters 131 and 132. Again, it shall be pointed out that there is at least one server cluster and that the exemplifying embodiment illustrated in FIG. 1a comprises at least two server clusters. It shall be pointed out that a group may comprise only one wavelength or a plurality of wavelengths.

The transceiver of one of the server clusters is configured to receive the signal from the at least one MD-WSS 110, wherein the server cluster is configured to perform at least a part of the requested service. It shall be pointed out that the server cluster may perform the whole service, but performs at least a part of the service.

Each server cluster may have a Top of Rack ToR, switch, which provides the required connectivity both for intra-cluster networking and for providing the input/output (I/O) to/from the server cluster. There may also be another stage of virtual switches between each ToR and the servers of a cluster. Each ToR may be equipped with a tunable Wavelength Divisional Multiplexor, WDM, transceiver, which may be dynamically tuned to any pair of wavelengths for sending and receiving. This is simply referred to as a transceiver hereinafter.

The datacentre 100 may comprise, or be coupled to, a control unit (not shown), which controls the transceivers of the server clusters 131 and 132, and also the MD-WSS(s). The control unit may receive a service request associated with the optical signal, wherein the control unit is configured to control the datacentre 100, e.g. the transceivers in such a manner that the proper server cluster performs an intended part of the service in a predefined order within the server clusters as defined by the service that is requested in the received service request associated with the optical signal. This will be explained in more detail below. The control unit may be coupled to the MD-WSS and the transceivers of the server clusters and the control unit may e.g. be an optical Software Defined Network, SDN, controller.

Once the server cluster has performed at least a part of the requested service, the transceiver is further configured to output a signal towards one of the at least one MD-WSS 110 the signal outputted from the transceiver having a wavelength of group B of wavelengths when at least one part of the service remains to be executed before the service is fully executed, and the signal outputted from the transceiver having a wavelength of the second A-group, which is denoted A2 in FIG. 1a, when the service is fully executed. In an illustrating example, the service that is to be performed according to the service request associated with the optical signal received by means of the MD-WSS 110 requires that e.g. server cluster SC-1, denoted 131 in FIG. 1a, performs a first part, then server cluster SC-5 (not shown) performs a second part, then SC-2 (not shown) performs a third part and finally server cluster SC-S, denoted 132 in FIG. 1a, performs a fourth part in order for the service to be fully executed. If so, then SC-1 has first received the part of the signal having A1 wavelengths from the MD-WSS 110, wherein the transceiver of server cluster SC-1 was configured, e.g. by means of being controlled by the control unit, to receive the part of the signal having A1 wavelengths from the MD-WSS 110. When the server cluster SC-1 has performed the first part of the service, the service is thus not fully executed in this illustrating example, wherein the transceiver of server cluster SC-1 is configured to (again e.g. by means of being controlled by the control unit) to output a signal towards the MD-WSS 110 in this example since there is only one MD-WSS, the signal outputted from the transceiver having a wavelength of group B of wavelengths.

The MD-WSS 110 is configured to receive the signal having a wavelength (or wavelengths) of group B on an input tributary port 112 for wavelengths of group B. The MD-WSS 110 is further configured to output the received signal having a wavelength (or wavelengths) of group B on the output tributary port 111 for wavelengths of group B, wherein the output tributary port for wavelengths of group B, when received on an input tributary port and not the common port 114, is the same output tributary port 111 as for signals comprising wavelengths of the first A-group, A1.

It shall be pointed out that an output tributary port for wavelengths of e.g. A1 may thus serve as an output for wavelengths of other groups and further serve as an input for wavelengths of yet other groups.

Following the illustrating example, the MD-WSS 110 outputs the signal having a wavelength (or wavelengths) of group B on output tributary port 111 for wavelengths of group B when received on an input tributary port and not the common port 114. The signal is outputted towards the server clusters 131, 132. In the illustrating example, the transceiver of server cluster SC-5 is configured to (again e.g. by means of being controlled by the control unit) to receive the signal, wherein the server cluster SC-5 is configured to execute the second part of the service, wherein the transceiver of server cluster SC-5 is configured to (again e.g. by means of being controlled by the control unit) to output a signal towards the MD-WSS 110, the signal outputted from the transceiver having a wavelength of group B of wavelengths, since the service is still only partly executed.

As described above, the MD-WSS 110 is configured to receive the signal having a wavelength (or wavelengths) of group B on the input tributary port 112 for wavelengths of group B. The MD-WSS 110 is further configured to output the received signal having a wavelength (or wavelengths) of group B on the output tributary port 111 for wavelengths of group B, wherein the output tributary port for wavelengths of group B, when received on the input tributary port and not the common port 114, is the same output tributary port 111 as for signals comprising wavelengths of group A1.

Following the illustrating example, the transceiver of server cluster SC-2 is configured to (again e.g. by means of being controlled by the control unit) to receive the signal, wherein the server cluster SC-2 is configured to execute the third part of the service, wherein the transceiver of server cluster SC-2 is configured to (again e.g. by means of being controlled by the control unit) to output a signal towards the MD-WSS 110, the signal outputted from the transceiver having a wavelength of group B of wavelengths, since the service is still only partly executed.

As described above, the MD-WSS 110 is configured to receive the signal having a wavelength (or wavelengths) of group B on an input tributary port 112 for wavelengths of group B. The MD-WSS 110 is further configured to output the received signal having a wavelength (or wavelengths) of group B on the output tributary port 111 for wavelengths of group B, wherein the output tributary port for wavelengths of group B, when received on an input tributary port and not the common port 114, is the same output tributary port 111 as for signals comprising wavelengths of group A1.

Following the illustrating example, the transceiver of server cluster SC-S is configured to (again e.g. by means of being controlled by the control unit) to receive the signal, wherein the server cluster SC-S is configured to execute the fourth part of the service, wherein the transceiver of server cluster SC-S is configured to (again e.g. by means of being controlled by the control unit) to output a signal towards the MD-WSS 110, the signal outputted from the transceiver having a wavelength of group A2 since the service is now fully executed according to the illustrating example.

The MD-WSS 110 is configured to receive the signal having a wavelength (or wavelengths) of group A2 on an input tributary port 112 for wavelengths of group A2, wherein the input tributary port for signals comprising wavelengths of group A2 is the same tributary port 112 as the input tributary port for signals comprising wavelengths of group B. The MD-WSS 110 is further configured to output the received signal having a wavelength (or wavelengths) of group A2 on its common port 114.

Looking at FIG. 1a, the optical signal associated with the service request is received on the common port 114 and then goes in a clockwise direction in the figure until the service is fully executed by the datacentre, wherein the signal having a wavelength (or wavelengths) of group A2 is outputted from the datacentre 100 by means of the common port 114 of the MD-WSS 110 once the service is fully executed.

Figure 1B:
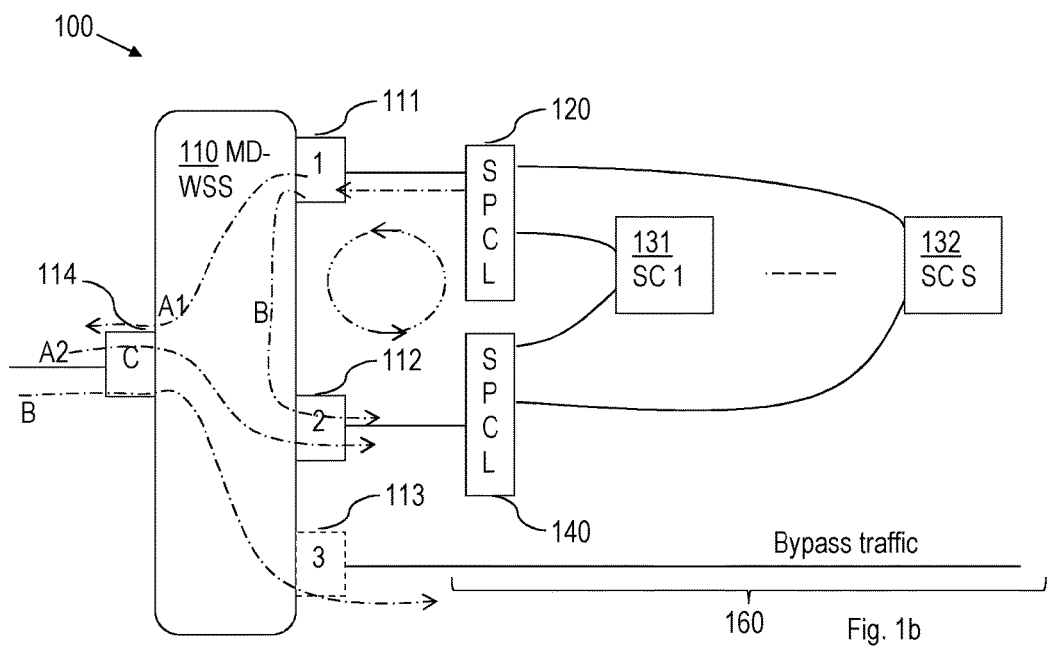
FIG. 1b is an illustration of a datacentre and the architecture thereof according to yet an exemplifying embodiment.

FIG. 1b illustrates another example of the datacentre receiving an optical signal associated with a service, or service request. In the example illustrated in FIG. 1b, the datacentre 100 receives the optical signal and the optical signal comprises at least one wavelength of a first A-group, A2, of wavelengths. It is emphasised that in FIG. 1b, the first A-group is denoted A2 and not A1. The datacentre 100 receives the optical signal by means of the common port 114 and outputs the part of the signal having a wavelength, or wavelengths, of group A2 on an output tributary port 112 for wavelengths of group A2 when received on the common port. The part of the signal having a wavelength, or wavelengths, of group A2 is outputted towards the group 160 of server clusters 131 and 132. The output tributary port 112 for A2 wavelengths when received on the common port 114 is the same tributary port of the MD-WSS 110 as the input tributary port 112 for A2 and B wavelengths when received from the group 160 of the server clusters. This illustrates that a tributary port may act as an input port for some wavelengths and an output port for other wavelengths. Further, it matters whether a signal is received on the common port 114 or on one of the tributary port 111-113. If a signal comprising wavelengths A2 is received on the input tributary port 112 for A2 wavelengths, i.e. wavelengths of group A2, then the signal is outputted on the common port 114 as illustrated in FIG. 1a. However, if a signal comprising wavelengths A2 is received on the common port 114, it is outputted on the output tributary port 112 for A2 wavelengths, which is the same tributary port as the input tributary port for signals comprising wavelengths of groups A2 and B, when received from the group 160 of server clusters.

Thus, as illustrated in FIG. 1b, the signal is outputted from the MD-WSS 110 towards the group 160 of server cluster. In the same manner as described above, the transceiver of one of the server clusters is configured to receive the signal from the at least one MD-WSS 110, wherein the server cluster is configured to perform at least a part of the requested service. Once the server cluster has performed at least a part of the requested service, the transceiver is further configured to output a signal towards one of the at least one MD-WSS 110 the signal outputted from the transceiver having a wavelength of group B of wavelengths when at least one part of the service remains to be executed before the service is fully executed, and the signal outputted from the transceiver having a wavelength of the second A-group, A1, when the service is fully executed. Again, it is emphasised that the second A-group in FIG. 1b is denoted A1.

The MD-WSS 110 receives the signal from the group 160 of server clusters on the input tributary port 111 for wavelengths of group A1 and group B, being the same tributary port 111 for outputting wavelengths of group A1 when received on the common port 114. If the received signal from the server clusters comprises wavelength(s) of group A1, the signal is outputted on the common port, 114 and if the received signal from the server clusters comprises wavelength(s) of group B, the signal is outputted on the output tributary port 112 for wavelengths of group A2 and B, being the same tributary port as the input tributary port for wavelengths of group A2 and group B when received from the group 160 of clusters.

FIG. 1b illustrates the optical signal associated with the service request is received on the common port 114 and then goes in a counter-clockwise direction in the figure until the service is fully executed by the datacentre, wherein the signal having a wavelength (or wavelengths) of group A1 is outputted from the datacentre 100 by means of the common port 114 of the MD-WSS 110 once the service is fully executed.

FIGS. 1a and 1b illustrate that the inputted optical signal is travelling through the datacentre 100 in different ways depending on the wavelengths of the inputted optical signal. Again, the first A-group is any of A1, A2, A3, etc. and the second A-group is also any of A1, A2, A3, etc., wherein the first A-group is not the same as the second A-group.

FIGS. 1a and 1b further illustrate that the individual tributary ports 111-113 may serve as inputs for some wavelengths and outputs for other wavelengths. Further, an optical signal comprising a wavelength of one of the A-groups, i.e. A1, A2, A3, A4, etc. may be routed differently within the MD-WSS 110 depending on which A-group or groups that are comprised in the received optical signal.

A feature of the architecture type illustrated in FIG. 1a is the flexibility in sharing the total capacity between datacentre's I/O (number of wavelengths in group A) and intra-datacentre transport (number of wavelength in group B). That is, the transport capacity may be dynamically allocated for internal datacentre communication (for service chaining through the ring on wavelength group B) or for datacentre I/O, by changing the relative share of number of wavelength in groups A and B. In fact, any wavelength assignment strategy may be applied as long as no wavelength is used at the same time between group A and B (i.e. A∩B=0, where A=A1∪A2) and no wavelength is used at the same time between subgroups A1 and A2 (i.e., A1∩A2=0). This also implies that, the I/O capacity may dynamically be shared between downlink and uplink, i.e. between A1 and A2, respectively. Another feature of the illustrated in FIG. 1a is the simplicity, and the fact that the number of supported server clusters will not be limited by the number of WSS ports but merely by the optical power budget. Accordingly, to improve the optical power budget an optical amplifier may be introduced into the architecture of FIG. 1a, between the optical coupler and second tributary port 112 or any of tributary ports of the MD-WSS connecting to the group of server clusters.

The datacentre has several possible advantages. An advantage is that the data plane architecture is relatively simple, comprising relatively few MD-WSS compared to datacentres comprising regular WSSs. Another advantage is that the control plane and signalling may be relatively simple since the number of data-plane devices to be controlled may be limited to few ones, making the design of the control and signalling less complex. Still an advantage is simplicity of network management due to the above reasons, i.e. simple network architecture, the management mechanisms like configuration, performance management, fault detection and recovery, etc. can be realised relatively easily. Yet an advantage is that the datacentre provides support for dynamic capacity provisioning among different server clusters, but it also provides flexibility in dynamically sharing the total transport capacity between intra-datacentre communications and datacentre I/O traffic. A further advantage is scalability since in the proposed architecture neither the number of MD-WSSs nor the number of ports per MD-WSS needs to scale with the number of server clusters. Yet an advantage is low cost, both capital and operational wise.

According to an embodiment, the datacentre 100 further comprises a first splitter-coupler, SPCL, 120 having an input/output coupled to the output tributary port 111 for wavelengths of the first A-group and group B of the at least one MD-WSS 110 and at least one output/input per server clusters coupled to respective transceiver of the server clusters 131, 132.

It shall be pointed out that the SPCL 120 may have more outputs than there are server clusters and that a server cluster may have more than one transceiver. The SPCL 120 may comprise a plurality of splitter-combiner stages.

By means of the SPCL 120, any signal outputted from the output tributary port 111 for wavelengths of the first A-group and group B of the at least one MD-WSS 110 is split and sent, or forwarded, to all the server clusters. In this manner, all server clusters 131 and 132 are enabled to receive the signal, wherein the transceiver of at least one of the server clusters is configured to receive the signal, wherein that particular server cluster may perform at least a part of the service and then output the signal as described above with reference to both FIGS. 1a and 1b.

According to yet an embodiment, the datacentre 100 further comprises a second SPLC 140 having at least one output/input per server clusters, each respective output/input coupled to respective transceiver of the server clusters and an input/output coupled to the input tributary port 112 for wavelengths of the second A-group and group B of one of the at least one MD-WSS 110.

The second SPCL 140 is configured to receive any signal outputted from any of the server clusters 131 and 132 of the group of server clusters and forward the received signal to the input tributary port 112 for wavelengths of the second A-group and group B of one of the at least one MD-WSS 110.

A SPCL operates as a splitter in one direction, when the signal is received on the input/output coupled to one of the tributary ports of the MD-WSS, wherein the signal is split and forwarded towards all the server clusters. The same SPCL operates as a combiner in the opposite direction, when any signal is received on a respective input/output coupled to respective transceiver of the server clusters, wherein the signal is forwarded to the tributary port of the MD-WSS.

Looking at FIG. 1a, SPCL 120 operates as a splitter and SPCL 140 operates as a combiner when the received optical signal received on the common port 114 of the MD-WSS 110 comprises at least one wavelength of the first A-group, the first A-group being A1. Looking at FIG. 1b, SPCL 140 operates as a splitter and SPCL 120 operates as a combiner when the received optical signal received on the common port 114 of the MD-WSS 110 comprises at least one wavelength of the first A-group, the first A-group being A2.

According to still an embodiment, wherein N>2, the at least one MD-WSS 110 is configured to output a part of the signal received on the common port, the part of the signal comprising a wavelength of group B, on a bypass tributary port 113, not being the input tributary port or the output tributary port for wavelengths of group AX, X being an integer.

It shall be pointed out, that the transceiver of the server cluster completing the service, i.e. doing the last part of the processing, may output a signal having a wavelength of a third A-group instead of group B, wherein the MD-WSS 110 receives this signal on an input tributary port 112 for wavelengths of the third A-group, the input tributary port 112 for wavelengths of the third A-group being the same input tributary port as for wavelengths of the second A-group and group B. When the MD-WSS 110 receives wavelengths of the third A-group, i.e. when the service is completed, the MD-WSS 110 is configured to output those third A-group wavelengths on the bypass tributary port 113 for wavelengths of group B when received from the common port 114.

A part of, or the whole, optical signal may comprise wavelength(s) of group B. When the optical signal comprises at least one wavelength of group B, the at least wavelength of group B is outputted on the bypass tributary port 113.

It shall be pointed out that wavelengths of group B are used within the datacentre 100 for "circulating" signals within the datacentre until the service is fully executed. Thus, when a wavelength of group B is received by the MD-WSS 110 on an input tributary port for wavelengths of group B, the signal is outputted on an output tributary port that is coupled to the group 160 of server clusters; and when a wavelength of group B is received by the MD-WSS 110 on its common port, it is outputted on the bypass tributary port 113, which is not coupled to the group 160 of server clusters.

According to another embodiment, illustrated in FIGS. 1c-1f, the datacentre 100 comprises at least two MD-WSSs, wherein a second MD-WSS 150 is configured to (a) receive the signal comprising the wavelength of group B on its bypass tributary port 153 and output the signal received on its common port 154, or (b) receive the signal comprising the wavelength of group B on its common port 154 and output the signal on its bypass tributary port 153.

The datacentre 100 comprises at least one MD-WSS as described above. In the examples illustrated in FIGS. 1c-1f, the datacentre 100 comprises at least two MD-WSSs 110 and 150 which are interconnected with each other by means of their respective bypass tributary port 113 and 153. It shall be pointed out that FIGS. 1c-1f merely illustrates an example of how to interconnect two MD-WSSs and other examples will be described later.

Thus, in these examples, when the optical signal comprises at least one wavelength of group B, and it is received on either the common port 114 of the first MD-WSS 110 or the common port 154 of the second MD-WSS 150, the MD-WSSs 110 and 150 are configured to output the parts of the optical signal comprising wavelengths of group B on their respective bypass tributary port 113 and 153 respectively.

The datacentre 100 may further comprise at least one optical amplifier coupled to the common port 114, 154, or to one of the tributary ports 111-113, 151-153 of the MD-WSS 110, 150, the tributary port being coupled directly or indirectly to the transceiver of respective server cluster(s).

In order to avoid that either the optical signal or any signal "circulating" within the datacentre 100 suffers too much attenuation, one or more optical amplifiers may be arranged within the datacentre. There may be an optical amplifier coupled to the common port 114 or 154, wherein the received optical signal is amplified before being outputted on one of the tributary ports 111-113 or 151-153.

If the optical signal comprises wavelengths of e.g. the first A-group of wavelengths, then those wavelengths will be split in the SPCL 120 or 140, wherein that part of the signal may become weakened. By amplifying the received optical signal, the signal may be amplified such that it is strong enough when it reaches the group of server clusters. Likewise if the optical signal comprises wavelengths of group B, that part of the optical signal will also be amplified before being forwarded on the bypass tributary port, i.e. the group B part of the optical signal is amplified before being forwarded e.g. from tributary port 113 to tributary port 153.

The optical signal may result in a lot of processing within the datacentre in order to perform the service associated with the optical signal. Thus, looking at FIGS. 1a-1f, there may be many "rounds" within the datacentre, one round for each server cluster having to perform its part of the whole service. As signals are circulating around within the datacentre, they may suffer from attenuation, wherein an optical amplifier may be coupled to one of the tributary ports 111-113, 151-153 of the MD-WSS 110, 150 in order to compensate for such an attenuation.

Figure 1C:
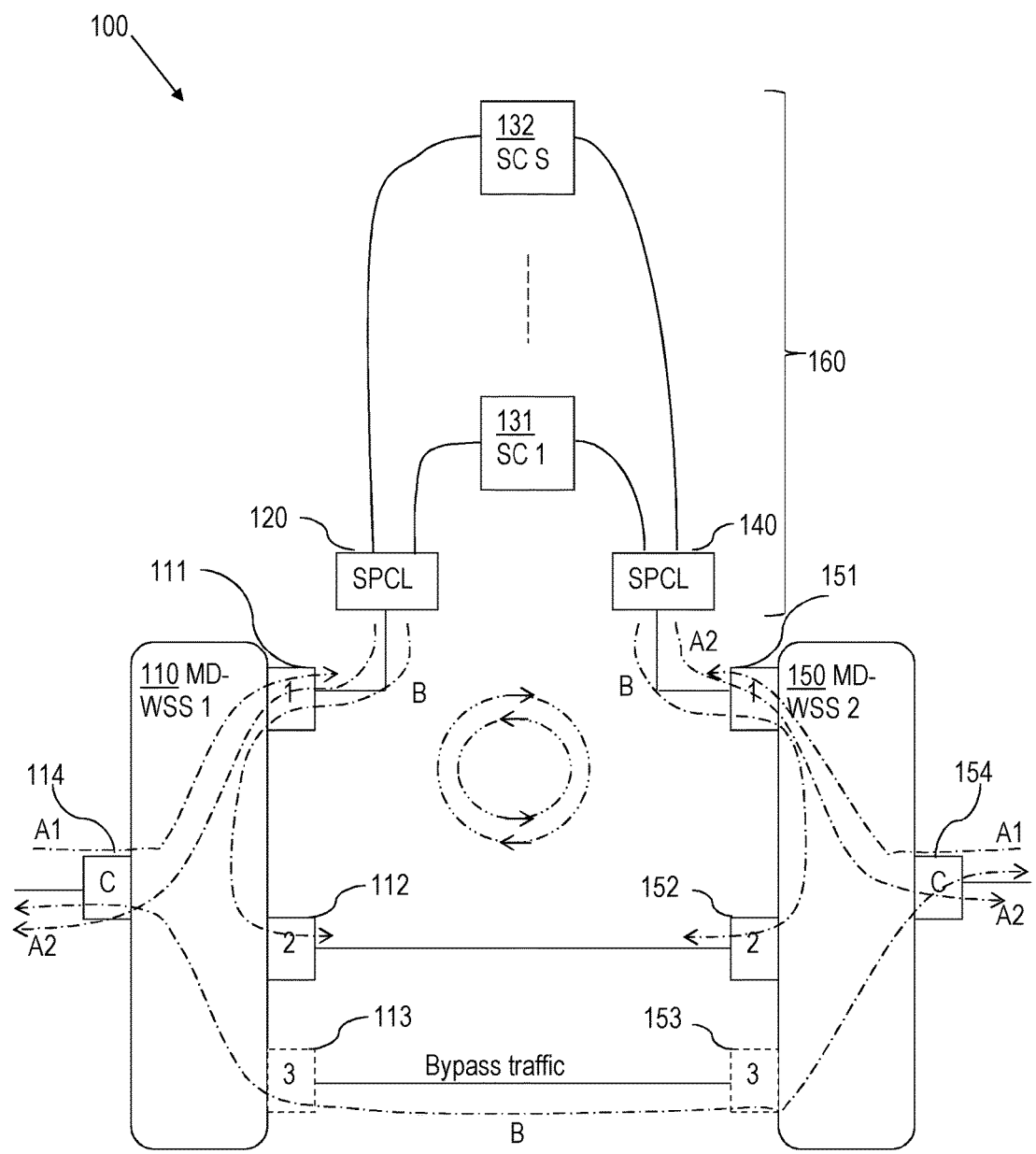
FIG. 1c is an illustration of a datacentre and the architecture thereof according to still an exemplifying embodiment.

According to an embodiment, wherein the number of MD-WSSs are two, a first MD-WSS 110 and a second MD-WSS 150, the first MD-WSS 110 is configured to receive the signal associated with the service on its common port 114, the signal comprising a part having a wavelength of the first A-group, in FIG. 1c denoted as A1, and to output the part of the signal having the wavelength of the first A-group, A1, on its output tributary port 111 for wavelengths of the first A-group, A1, of the first MD-WSS 110, wherein the output tributary port 111 for wavelengths of the first A-group, A1, of the first MD-WSS 110 is coupled to the respective transceiver of the server cluster(s) 131, 132. The respective transceiver of the server cluster(s) 131, 132 further is coupled to an input tributary port 151 for wavelengths of the second A-group, in FIG. 1c denoted A2, and group B of the second MD-WSS 150, wherein the two MD-WSSs are interconnected by means of the output tributary port 152 for wavelengths of group B of the second MD-WSS 150 and the input tributary port 112 for B wavelengths of the first MD-WSS 110.

The optical signal associated with the service comprising the first A-group of wavelengths, A1, is received on the common port 114 of the first MD-WSS 110 of the datacentre 100. As described above, the first MD-WSS 110 is configured to output the part of the signal having the wavelength of the first A-group, A1, on its output tributary port 111 for wavelengths of the first A-group, A1, of the first MD-WSS 110, wherein the output tributary port 111 for wavelengths of the first A-group, A1, of the first MD-WSS 110 is coupled to the respective transceiver of the server cluster(s) 131, 132. In FIG. 1c, there is a SPCL 120 arranged between the output tributary port 111 for wavelengths of the first A-group, A1, and the server clusters 131 and 132.

As described above, in conjunction with FIG. 1a, the transceiver of one of the server clusters is configured to receive the signal from the at least one MD-WSS 110, wherein the server cluster is configured to perform at least a part of the requested service. Once the server cluster has performed at least a part of the requested service, the transceiver is further configured to output a signal towards one of the at least one MD-WSS, which in FIG. 1c is the second MD-WSS 150, the signal outputted from the transceiver having a wavelength of group B of wavelengths when at least one part of the service remains to be executed before the service is fully executed, and the signal outputted from the transceiver having a wavelength of the second A-group, which is denoted A2 in FIGS. 1a and 1c, when the service is fully executed.

The second MD-WSS 150 is then configured to receive the signal having a wavelength (or wavelengths) of the second A-group or group B on an input tributary port 151 for wavelengths of the second A-group or group B. The second MD-WSS 150 is further configured to output wavelengths of group B of the signal on its output tributary port 152 for wavelengths of group B when received on an input tributary port, towards the first MD-WSS 110; and to output wavelengths of the second A-group of the signal on its common port 154.

If the signal from the group 160 of server clusters, received on tributary port 151 comprises wavelengths of group B, the second MD-WSS outputs those wavelengths on the tributary port 152 towards the first MD-WSS 110, wherein the first MD-WSS 110 receives those wavelengths on its input tributary port 112 for wavelengths of group B. The first MD-WSS 110 is configured, as described above in conjunction with FIG. 1a, to output wavelengths of group B on its tributary port 111 for wavelengths of group B, being the same tributary port as for outputting wavelengths of the first A-group, A1, towards the server clusters.

In this manner, signals may "circulate" within the datacentre 100, in clockwise direction, going from MD-WSS 110 to the server clusters to MD-WSS 150 to MD-WSS 110 to the server clusters to MD-WSS 150 until the service is fully performed or executed, wherein the last server cluster outputs the signal having a wavelength of the second A-group which is then outputted on the common port of the second MD-WSS 150.

According to still an embodiment, the datacentre 100 comprises two MD-WSSs, a first MD-WSS 110 and a second MD-WSS 150, wherein the second MD-WSS 150 is configured to receive the signal associated with the service on its common port 154, the signal comprising a part having a wavelength of the first A-group (denoted A1 in FIG. 1c) and to output the part of the signal having the wavelength of the first A-group, A1, on its output tributary port 151 for wavelengths of the first A-group, A,1 of the second MD-WSS 150. The output tributary port 151 for the first A-group wavelengths of the second MD-WSS 150 is coupled to the respective transceiver of the server cluster(s) 131, 132 and the input tributary port 111 for wavelengths of the second A-group (denoted A2 in FIG. 1c) and group B of the first MD-WSS 110 is coupled to the respective transceiver of the server cluster(s), wherein the two MD-WSSs are interconnected by means of the output tributary port 112 for wavelengths of group B of the first MD-WSS 110 and the input tributary port 152 for wavelengths of group B of the second MD-WSS 150.

FIG. 1c illustrates the datacentre 100 receiving the optical signal associated with the service comprising the first A-group of wavelengths, A1, by means of the common port 154 of the second MD-WSS 150 of the datacentre 100. As described above, the second MD-WSS 150 is configured to output the part of the signal having the wavelength of the first A-group, A1, on its output tributary port 151 for wavelengths of the first A-group, A1, of the second MD-WSS 150, wherein the output tributary port 151 for wavelengths of the first A-group, A1, of the second MD-WSS 150 is coupled to the respective transceiver of the server cluster(s) 131, 132. In FIG. 1*c*, there is a SPCL 140 arranged between the output tributary port 151 for wavelengths of the first A-group, A1, and the server clusters 131 and 132.

As described above, the transceiver of one of the server clusters is configured to receive the signal from the at least one MD-WSS 150, wherein the server cluster is configured to perform at least a part of the requested service. Once the server cluster has performed at least a part of the requested service, the transceiver is further configured to output a signal towards one of the at least one MD-WSS, which in FIG. 1*c* is the first MD-WSS 110, the signal outputted from the transceiver having a wavelength of group B of wavelengths when at least one part of the service remains to be executed before the service is fully executed, and the signal outputted from the transceiver having a wavelength of the second A-group, which is denoted A2 in FIGS. 1*a* and 1*c*, when the service is fully executed.

The first MD-WSS 110 is then configured to receive the signal having a wavelength (or wavelengths) of the second A-group or group B on an input tributary port 111 for wavelengths of the second A-group or group B. The first MD-WSS 110 is further configured to output wavelengths of group B of the signal on its output tributary port 112 for wavelengths of group B when received on an input tributary port, towards the second MD-WSS 150; and to output wavelengths of the second A-group of the signal on its common port 114.

If the signal from the group 160 of server clusters, received on tributary port 151 comprises wavelengths of group B, the first MD-WSS 110 outputs those wavelengths on the tributary port 112 towards the second MD-WSS 150, wherein the second MD-WSS 150 receives those wavelengths on its input tributary port 152 for wavelengths of group B. The second MD-WSS 150 is configured, as described above, to output wavelengths of group B on its tributary port 151 for wavelengths of group B, being the same tributary port as for outputting wavelengths of the first A-group, A1, towards the server clusters.

In this manner, signals may "circulate" within the datacentre 100, in counter-clockwise direction, going from MD-WSS 150 to the server clusters to MD-WSS 110 to MD-WSS 150 to the server clusters to MD-WSS 110 until the service is fully performed or executed, wherein the last server cluster outputs the signal having a wavelength of the second A-group which is then outputted on the common port of the first MD-WSS 110.

Figure 1D:
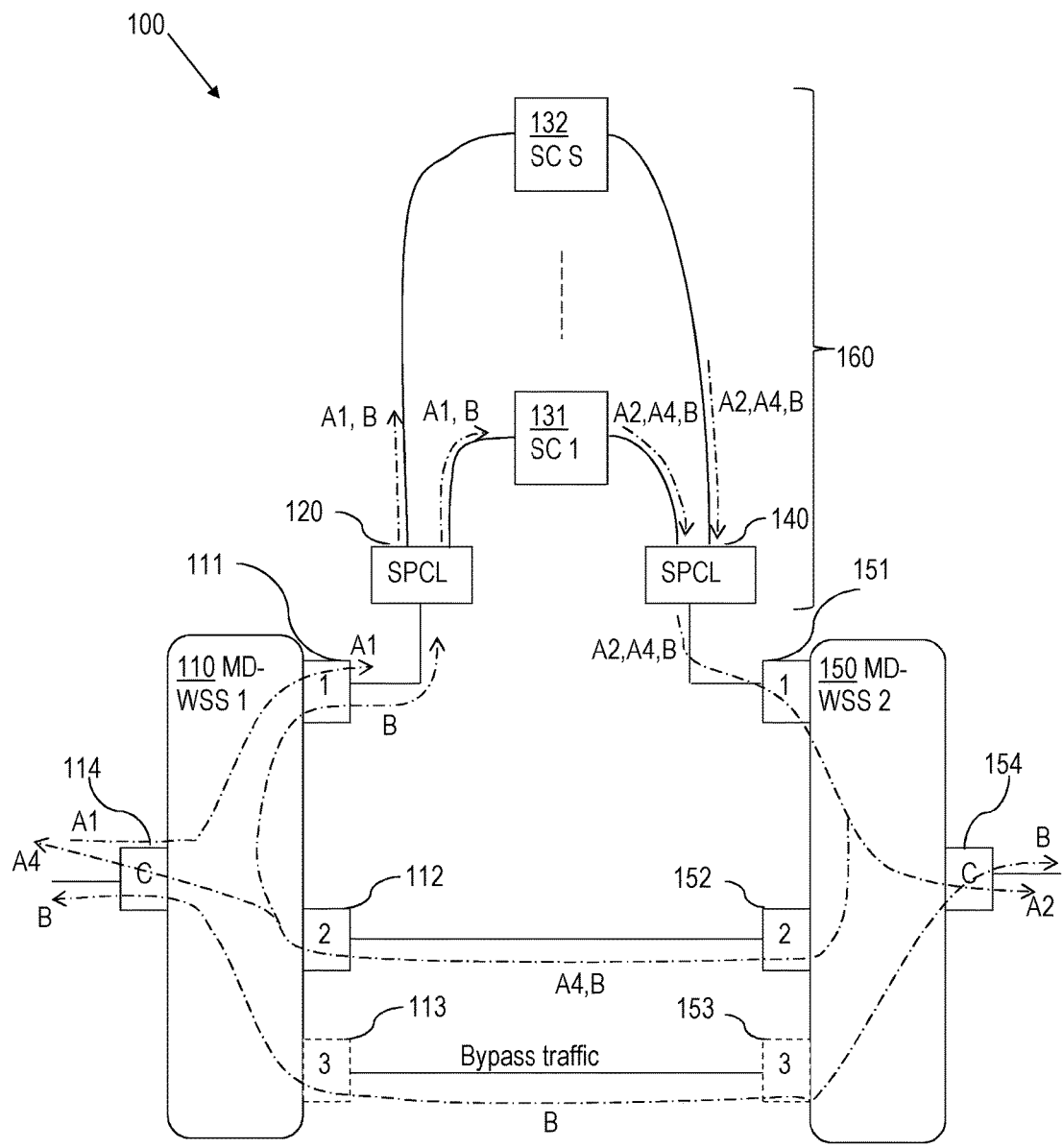
FIG. 1d is an illustration of a datacentre and the architecture thereof according to another exemplifying embodiment.

According to still an embodiment, illustrated in FIG. 1*d*, the first MD-WSS 110 is configured to receive the signal associated with the service on its common port 114, the signal comprising a wavelength of the first A-group, in FIG. 1*d* denoted A1, the first MD-WSS 110 being configured to output the part of the signal comprising wavelengths of the first A-group, A1, on the output tributary port 111 for the first A-group, A1, wavelengths towards the server clusters 131, 132. The transceiver of one of the server clusters is configured to receive the signal and to, once the server clusters has performed at least a part of the requested service, output a signal towards the second MD-WSS 150, the signal outputted from the transceiver having a wavelength of group B of wavelengths when at least one part of the service remains to be executed before the service is fully executed, and the signal outputted from the transceiver having a wavelength of the second A-group, in FIG. 1*d* denoted A2 or having a wavelength of a fourth A-group, in FIG. 1*d* denoted A4, of wavelengths when the service is fully executed. The second MD-WSS 150 is configured to receive the signal comprising a wavelength of groups A2, A4 (i.e. the second or the fourth A-group) or group B on its input tributary port 151 for wavelengths of groups A2, A4 or B, and to (I) when the wavelength of the signal is of group A2: output the signal on its common port 154, or (II) when the wavelength of the signal is of group A4 or B: output the signal on its output tributary port 152 for wavelengths of group A4 and B towards the first MD-WSS 110. the first MD-WSS is configured to receive the signal on its input tributary port 112 for wavelengths of group A4 and B, and (III) when the signal comprises a wavelength of group A4: output the signal on its common port 114, or (IV) when the signal comprises a wavelength of group B: output the signal on its output tributary port for wavelengths A1 and B towards the server clusters 131, 132.

The datacentre 100 may receive the optical signal associated with the service on the common port of one of the MD-WSSs. In FIG. 1*d*, the optical signal is received on the common port 114 of the first MD-WSS 110. The optical signal comprises at least one wavelength of the first A-group, in FIG. 1*d* denoted A1, the first MD-WSS 110 being configured to output the part of the signal comprising wavelengths of the first A-group, A1, on the output tributary port 111 for the first A-group, A1, wavelengths towards the server clusters 131, 132. FIG. 1*d* further illustrates the datacentre comprising two SPCLs 120 and 140 arranged between each respective MD-WSS and the server clusters 131 and 132.

FIG. 1*d* further illustrates the signal comprising A1 wavelengths being forwarded to all server clusters by means of the SPCL 120, wherein the transceiver of one of the server clusters is configured to receive the signal and to, once the server clusters has performed at least a part of the requested service, output a signal towards the second MD-WSS 150, the signal outputted from the transceiver having a wavelength of group B of wavelengths when at least one part of the service remains to be executed before the service is fully executed, and the signal outputted from the transceiver having a wavelength of the second A-group, in FIG. 1*d* denoted A2 or having a wavelength of a fourth A-group, in FIG. 1*d* denoted A4, of wavelengths when the service is fully executed.

The reason for having two different options for the wavelength outputted from the server clusters once the services is completed is due to network planning issues. If the service is not fully complete, using the wavelength B makes the server clusters processing the service until the service is completed, as has been described in detail above.

In this embodiment, once the service is completed, the transceiver of the server cluster performing the final part of the service is configured to output a signal having a wavelength of the second or the fourth A-group (i.e. A2 or A4). The signal is outputted towards the second MD-WSS 150 which in turn is configured to output signals comprising wavelengths of the second A-group. If the signal comprises a wavelength of the fourth A-group, i.e. A4, the second MD-WSS 150 is configured to output the signal towards the first MD-WSS 110. The second MD-WSS 150 thus outputs the signal on its tributary port 152 for signals comprising wavelength(s) of the fourth A-group and group B.

The first MD-WSS 110 receives the signal on its input tributary port 112 for signals comprising wavelength(s) of the fourth A-group and group B, wherein the first MD-WSS 110 is configured to output signals comprising wavelength(s) of the fourth A-group on its common port 114. If the signal received on the input tributary port 112 for signals comprising wavelength(s) of the fourth A-group and group B comprises wavelength(s) of group B, the first MD-WSS 110 is configured to output the signal back towards the server clusters by means of its output tributary port 111 for the first A-group of wavelengths, being the same as the output tributary port for wavelengths of group B when received on a tributary port and not on the common port.

Both the first MD-WSS 110 and the second MD-WSS 150 are configured to, when the optical signal received on the common port 114, 154 being associated with the requested service comprises wavelength(s) of group B, output the part of the optical signals comprising wavelength(s) of group B on its bypass tributary port 113, 153 not being any of the tributary ports coupled to the server clusters 131, 132 of the datacentre 100.

This example illustrates that the output signal that is outputted once the service is completed may be outputted by any of the MD-WSSs of the datacentre 100, irrespective of which MD-WSS received the optical signal associated with the service, or service request.

Figure 1E:
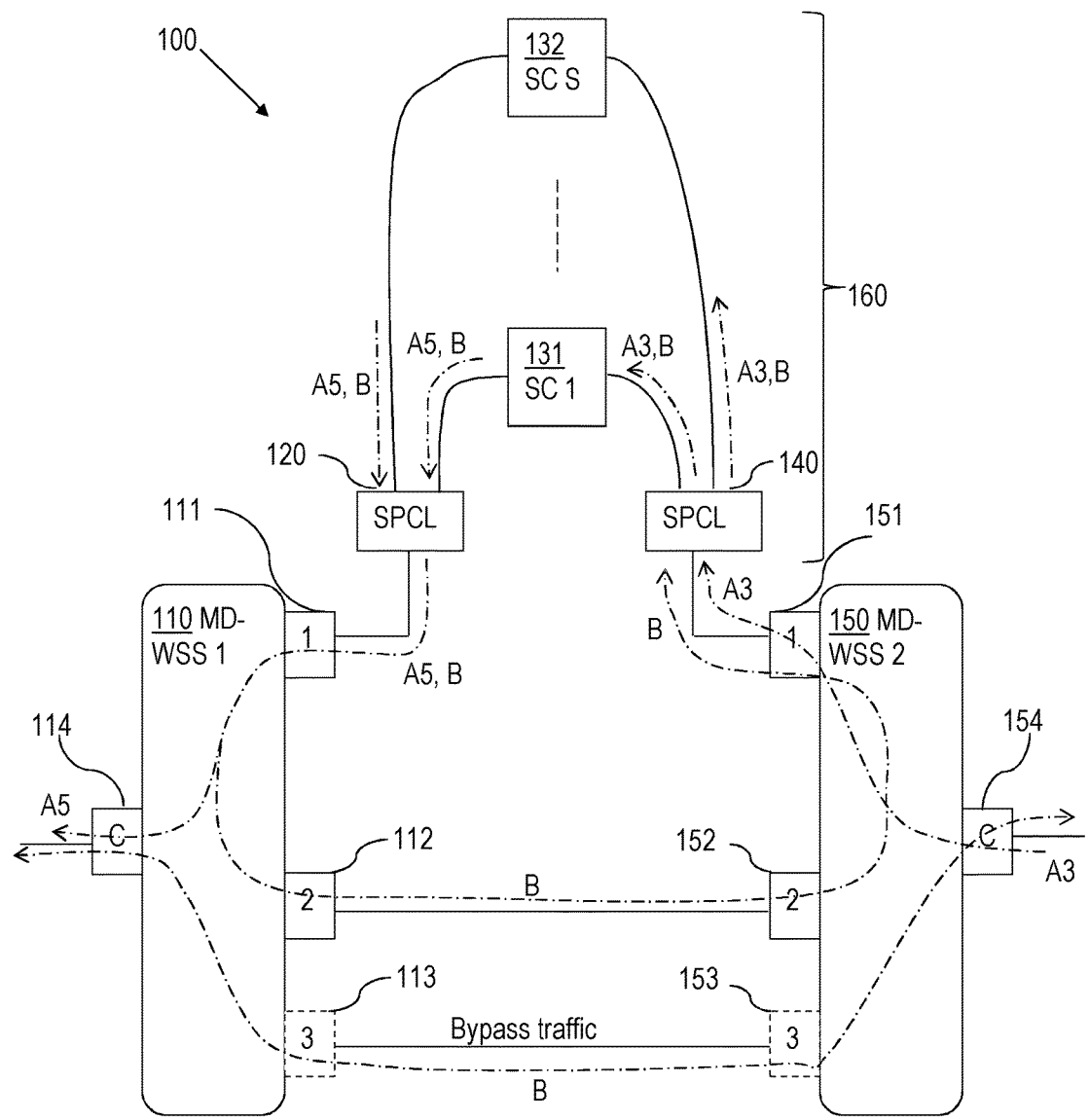
FIG. 1e is an illustration of a datacentre and the architecture thereof according to a further exemplifying embodiment.

According to yet an embodiment illustrated in FIG. 1e, the second MD-WSS 150 is configured to receive the signal associated with the requested service on its common port 154, the signal comprising a wavelength of a third A-group, in FIG. 1d denoted A3, the second MD-WSS 150 further being configured to output the part of the signal comprising a wavelength of the third A-group, A3, on its output tributary port 151 for wavelengths of the third A-group, A3, towards the server clusters 131, 132. The transceiver of one of the server clusters is configured to receive the signal and to, once the server cluster has performed at least a part of the requested service, output a signal towards one of the first MD-WSS 110, the signal outputted from the transceiver having a wavelength of group B when at least one part of the service remains to be executed before the service is fully executed, and the signal outputted from the transceiver having a wavelength of a fifth A-group, in FIG. 1d denoted A5, when the service is fully executed. The first MD-WSS 110 is configured to receive the signal comprising a wavelength of the fifth A-group, A5 or group B on its input tributary port 111 for wavelength of the fifth A-group, A5 and group B and to output wavelengths of the fifth A-group A5 on its common port 114 and to output wavelengths of group B on the output tributary port 112 for wavelengths of group B towards the second MD-WSS 150. The second MD-WSS 150 is configured to receive the signal comprising a wavelength of group B on its input tributary port 152 for wavelengths of group B and to output the signal on its output tributary port 151 for wavelengths of group B, the output tributary port 151 for wavelengths of group B being the same as the output tributary port for wavelengths of the third A-group, A3, towards the server clusters 131, 132.

The datacentre 100 in this example receives the optical signal associated with the service by means of the second MD-WSS 150, on its common port 154. The received optical signal comprises a wavelength, or wavelengths, of the third A-group, A3, wherein the second MD-WSS 150 further is configured to output the part of the signal comprising a wavelength of the third A-group, A3, on its output tributary port 151 for wavelengths of the third A-group, A3, towards the server clusters 131, 132.

The part of the optical signal comprising a wavelength, or wavelengths, of the third A-group, A3, is received by one of the server clusters 131, 132 by means of its transceiver which is configured to receive wavelengths of the third A-group. In the same manner as described above with reference to previous figures, each server cluster performs its part of the processing to complete the service, wherein the transceiver of the server cluster performing the last part of processing in order to complete the service outputs a signal having a wavelength of the fifth A-group, A5. When the first MD-WSS 110 receives the signal having a wavelength of the fifth A-group, A5, the MD-WSS 110 is configured to output the signal on its common port 114.

FIG. 1e thus illustrates the optical signal associated with the request being received by means of the second MD-WSS 150, wherein the signals having a wavelength of group B may be "circulating" around within the datacentre 100 until the service is completed, wherein the final output signal is outputted by means of the first MD-WSS 110. Thus, the output signal from the datacentre 110 in this example is outputted from another MD-WSS than the MD-WSS by means of which the optical signal associated with the service, or service request, is received.

Figure 1F:
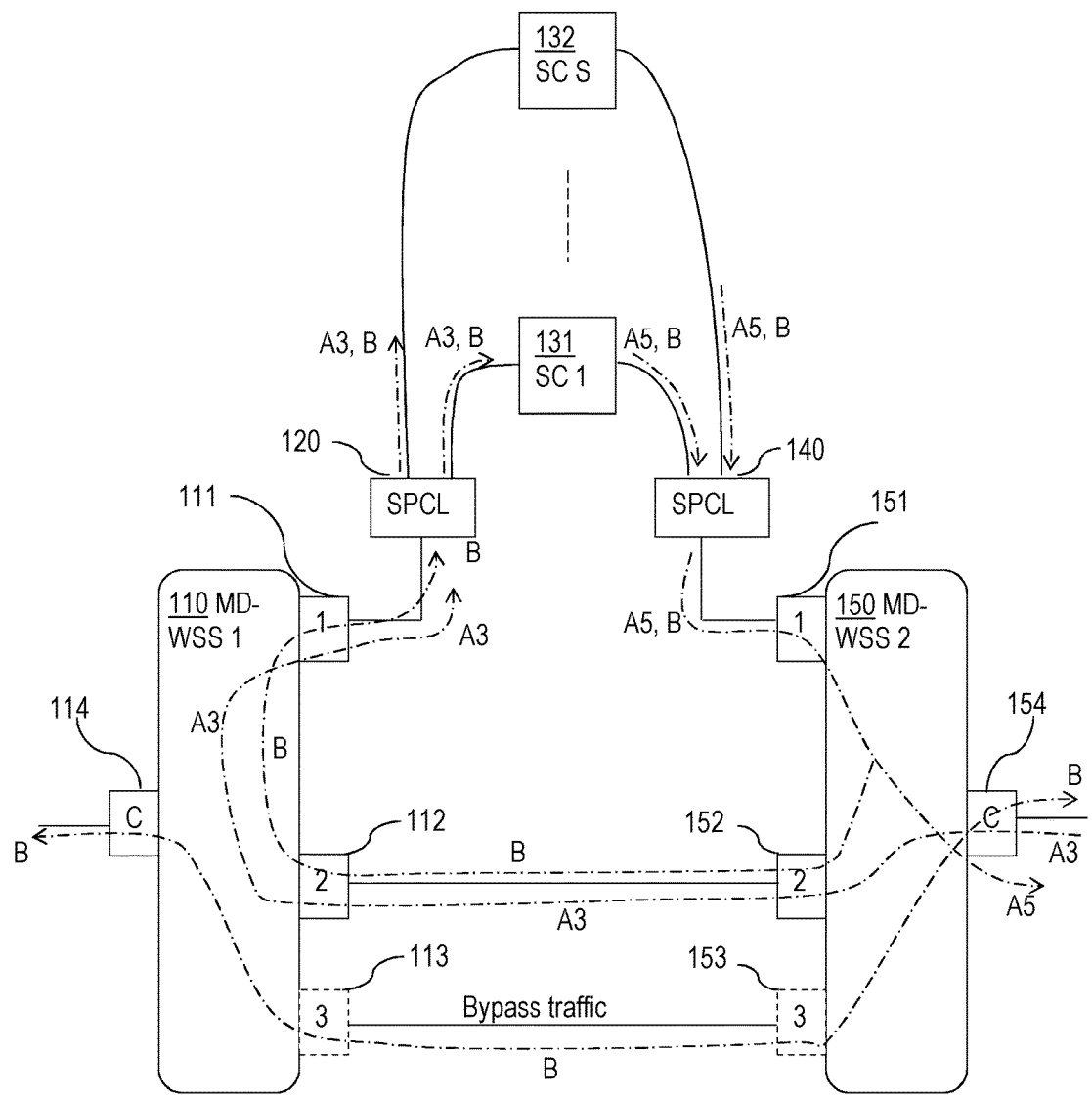
FIG. 1f is an illustration of a datacentre and the architecture thereof according to yet an exemplifying embodiment.

According to another embodiment illustrated in FIG. 1f, the second MD-WSS 150 is configured to receive the signal associated with the requested service on its common port 154, the signal comprising a wavelength of the third A-group, in FIG. 1f denoted A3, the second MD-WSS 150 further being configured to output the part of the signal comprising a wavelength of the third A-group, A3, on its output tributary port 152 for wavelengths of the third A-group, A3, towards the first MD-WSS 110. The first MD-WSS 110 is configured to receive the signal comprising a wavelength of the third A-group, A3, on its input tributary port 112 for wavelengths of the third A-group, A3, and to output the signal on its output tributary port 111 for wavelengths of the third A-group, A3, towards the server clusters 131, 132. The transceiver of one of the server clusters is configured to receive the signal and to, once the server cluster has performed at least a part of the requested service, output a signal towards the second MD-WSS 150, the signal outputted from the transceiver having a wavelength of group B when at least one part of the service remains to be executed before the service is fully executed, and the signal outputted from the transceiver having a wavelength of a fifth A-group, in FIG. 1f denoted A5, when the service is fully executed. The second MD-WSS 150 is configured to receive the signal on its input tributary port 151 for wavelengths of the fifth A-group, A5, and group B, and to output parts of the signal comprising wavelength(s) of the fifth A-group, A5, on its common port 154 and parts of the signals comprising wavelength(s) of group B on its output tributary port 152 for wavelengths of group B.

The datacentre 100 in this example receives the optical signal associated with the service by means of the second MD-WSS 150, on its common port 154. The received optical signal comprises a wavelength, or wavelengths, of the third A-group, A3, wherein the second MD-WSS 150 further is configured to output the part of the signal comprising a wavelength of the third A-group, A3, on its output tributary port 152 for wavelengths of the third A-group, A3, towards the first MD-WSS 110.

The first MD-WSS 110 is configured to receive the signal from the transceiver on an input tributary port 112 for wavelengths of the third A-group, A3, and to output the signal on its output tributary port 111 for wavelengths of the third A-group, A3, towards the server clusters 131 and 132.

As described above, the transceiver of one of the server clusters is configured to receive the signal and to, once the server cluster has performed at least a part of the requested service, output a signal towards the second MD-WSS 150, the signal outputted from the transceiver having a wavelength of group B when at least one part of the service remains to be executed before the service is fully executed, and the signal outputted from the transceiver having a wavelength of the fifth A-group, A5, when the service is fully executed. The second MD-WSS 150 is configured to receive the signal on its input tributary port 151 for wavelengths of the fifth A-group, A5, and group B, and to output parts of the signal comprising wavelength(s) of the fifth A-group, A5, on its common port 154 and parts of the signals comprising wavelength(s) of group B on its output tributary port 152 for wavelengths of group B towards the first MD-WSS 110.

The example of FIG. 1*f* illustrates that the MD-WSS that receives the initial optical signal associated with the service, or service request, may forward the signal to the other MD-WSS instead of forwarding the signal to the server clusters. Instead the other MD-WSS will forward the signal to the server clusters.

The signals outputted from the respective transceivers of the server clusters 131 and 132 will circulate within the datacentre 100 in the clockwise direction until the service is fully executed, i.e. completed, wherein the output signal from the datacentre is outputted from the common port of the second MD-WSS 150. It shall be pointed out that FIGS. 1*d* and 1*f* could be combined such that the transceiver of the server cluster completing the service outputs a signal having wavelength(s) of an A-group of wavelengths such that the second MD-WSS 150 forwards the signal on its output tributary port 152 towards the first MD-WSS 110, wherein the first MD-WSS 110 is configured to output the signal on its common port 114.

In FIGS. 1*a*-1*f*, the MD-WSS 110 is illustrated having a first tributary port 111, a second tributary port 112 and a third tributary port 113, wherein the first and the second tributary port 111 and 112 are coupled directly or indirectly to the server clusters. The first and the second tributary port 111 and 112 may operate as output tributary ports for some wavelengths and as input tributary ports for some wavelengths. FIGS. 1*c*-1*f* also illustrate the datacentre comprising two MD-WSS, wherein the second MD-WSS 150 has a first tributary port 151, a second tributary port 152 and a third tributary port 153, wherein the first and the second tributary port 151 and 152 are coupled directly or indirectly to the server clusters. In FIGS. 1*c*-1*f*, the two MD-WSSs are interconnected at least by means of their respective second tributary port 112 and 152 respectively. The two MD-WSSs may be configured in different ways so that the initial optical signal associated with the service, or service request, may be received by means of the common port of either the first or the second MD-WSS. The signals "circulating" within the datacentre 100 during the processing of the service may go in a clockwise or counter clockwise direction. Upon completion of the service, the outputted signal may be outputted on the common port of any of MD-WSS irrespective of which MD-WSS that received the initial optical signal associated with the service, or service request. In FIGS. 1*c*-1*f*, the two MD-WSSs are interconnected also by their respective tributary port, i.e. their respective third tributary port 113 and 153, wherein any part of a signal received the common port 114 or 154 having a wavelength, or wavelengths, of group B will be outputted from the receiving MD-WSS on its bypass tributary port towards the other MD-WSS which in turn will output the received signal on its common port.

Similar to the architecture type illustrated in FIGS. 1*a* and 1*b*, again here the datacentre may benefit from the flexibility in capacity sharing between the I/O and intra-datacentre transport (the ring). In terms of wavelength assignment strategy the constraints are as follows. The first constraint is that no wavelength can be assigned at the same time to both the groups A and B (i.e., $A \cap B = 0$, where $A = A1 \cup A2 \cup A3 \cup A4 \cup A5$). Furthermore, the wavelength assignment should be unique within each of the sets (A1, A3, A4), (A2, A3, A4) and (A3, A4), i.e. ($A1 \cap A3 \cap A4 = 0 \wedge A2 \cap A3 \cap A4 = 0 \wedge A3 \cap A4 = 0$). A difference of the two architecture types of FIGS. 1*a*-1*b* and FIGS. 1*c*-1*f*, in terms of usage, is that in the second architecture there is more flexibility in routing traffic into and out of the datacentre. In fact, in the architecture illustrated in FIGS. 1*c*-1*f*, the traffic can enter the datacentre from any direction (I/O ports 1 and 2), and after the completion of the service the traffic can again be directed to any of the two directions.

In embodiments and examples described below, it will be further illustrated that the outputted signal, which is outputted upon completion of the service, may alternatively be outputted on the bypass tributary port.

More than one realisation of basic architectures of the type illustrated in FIGS. 1*a* and 1*b* and/or the type illustrated in FIGS. 1*c*-1*f* may be combined to provide more advanced networking structures, for example for the case where there are Virtual Network Functions, VNFs, distributed over several datacentres and/or several (separate) segments within a datacentre. The number of possible permutations may be quite large, and some examples are illustrated below.

Figure 2A:
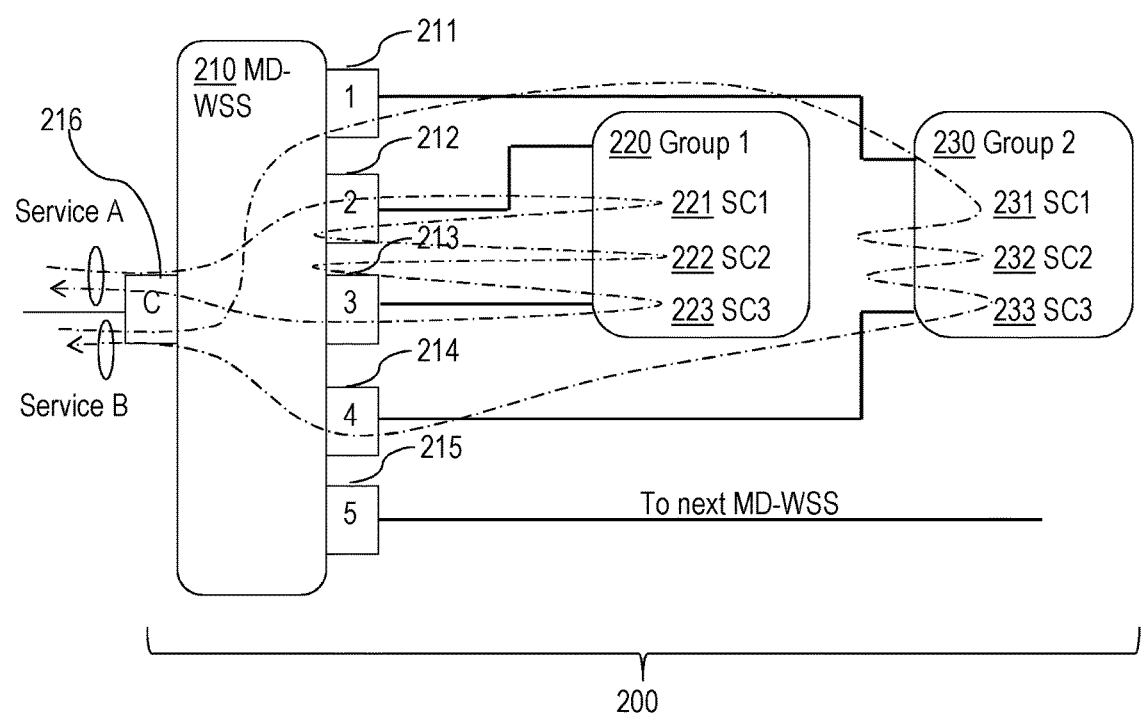
FIG. 2a is an illustration of a datacentre and the architecture thereof according to an exemplifying embodiment.

According to yet another embodiment, illustrated in FIG. 2*a*, the datacentre 200 comprises at least two groups 220, 230 of server clusters 221-223, 231-233, wherein the at least one MD-WSS 210 has at least twice as many tributary ports 211-215 as there are groups of server clusters connected to it, wherein a pair of tributary ports comprising an input tributary port and an output tributary port are coupled to each group of server clusters, wherein the internal relationship between each pair of tributary ports and the common port corresponds to the relationship between the input and the out tributary port and the common port as described above in conjunction with FIGS. 1*a*-1*f*.

The datacentre 200 in FIG. 2*a* comprises only one MD-WSS 210, which in this example has five tributary ports 211-215. In this example, the datacentre has two groups of server clusters, 220 and 230, instead on just one group 160 as in the examples illustrated in FIGS. 1*a*-1*f* above.

The first group 220 of server clusters is coupled to two individual tributary ports of the MD-WSS 210, namely tributary port 2 with reference sign 212 and tributary port 3 reference sign 213. The second group 230 of server clusters is coupled to two individual tributary ports of the MD-WSS 210, the two tributary ports not being any of the tributary ports coupled to the first group 220. Instead, the second group 230 of server clusters is coupled to tributary port 1 with reference sign 211 and tributary port 4 reference sign 214. In the exemplifying embodiment illustrated in FIG. 2*a*, each group of server clusters comprises three server clusters 221-223 and 231-133 respectively.

The MD-WSS 210 together with the first group 220 of server clusters SC1, SC2 and SC3 with reference signs 221-223 operates in the same manner as described above with reference to FIGS. 1*a*-1*f* and the MD-WSS 110 and 150 together with the group 160 of server clusters 131-132. Likewise for the MD-WSS 210 together with the second group 220 of server clusters with reference signs 231-233.

FIG. 2*a* further illustrates an example of a service A and a service B. Again, the datacentre 200 may comprise, or be coupled to, a control unit (not shown), which controls the transceivers of the server clusters 221-223 and 231-233. The control unit may receive a service request associated with the optical signal, wherein the control unit is configured to control the datacentre 200, e.g. the transceivers in such a manner that the proper server cluster performs an intended part of the service in a predefined order within the server clusters as defined by the service that is requested in the received service request associated with the optical signal.

In the example illustrated in FIG. 2a, the datacentre 200 receives an optical signal associated with a service A, or a service request for service A. As described above, the optical signal comprises a wavelength of a first A-group for the first group 220 of server clusters, wherein the service requires in this particular example that SC1 with reference sign 221 first performs a first part, the SC2 with reference sign 222 performs a second part and the SC3 performs a third and last part of the service, wherein the service is completed. This is schematically illustrated in FIG. 2a by the dotted line. Thus, the datacentre 200 receives an optical signal associated with a service A, or a service request for service A, the optical signal comprising the wavelength of the first A-group for the first group 220 of server clusters 221-223. Consequently, the MD-WSS 210 outputs the signal on its output tributary port 212 for wavelengths of the first A-group. The transceiver of the first server cluster 221 is configured to receive the signal, the server cluster 221 is configured to perform the first part of the service, wherein the transceiver of server cluster 221 is configured to output a signal having a wavelength, or wavelengths, of group B towards the MD-WSS 210. The MD-WSS 210 is configured to receive the signal having the wavelength(s) of group B on its input tributary port 213 for wavelengths of group B, and to output the signal on its output tributary port 212 for wavelengths of group B, being the same tributary output port as for wavelengths of the first A-group, i.e. the second tributary port 212 of MD-WSS 210. The signal is received by the transceiver of server cluster 222, wherein server cluster 222 performs the second part of the service, wherein the transceiver outputs a signal having a wavelength (or wavelengths) of group B towards the MD-WSS 210. MD-WSS receives the signal on its third tributary port 213, and outputs the signal again on its second tributary port towards the first group 220 of server clusters 221-223. This time, the transceiver of server cluster 223 wherein server cluster 223 performs the third and final part of the service, wherein the transceiver outputs a signal having a wavelength (or wavelengths) of a second A-group for the first group 220 of server clusters towards the MD-WSS 210. The MD-WSS 210 is configured to receive the signal on its input tributary port 213 for wavelengths of the second A-group for the first group 220 of server clusters, being the same tributary port for receiving wavelengths of group B from the group 220 of server clusters. The MD-WSS 210 is further configured to output the signal having the wavelength (or wavelengths) of the second A-group for the first group 220 of server clusters on its common port 216.

Further in the example illustrated in FIG. 2a, the datacentre 200 receives an optical signal associated with a service B, or a service request for service B. As described above, the optical signal comprises a wavelength of a first A-group for the second group of server clusters 213-233. The service B requires in this particular example that SC1 with reference sign 231 first performs a first part, the SC2 with reference sign 232 performs a second part and the SC3 with reference sign 233 performs a third and last part of the service, wherein the service is completed. The service B is executed in the same manner in the second group 230 of server clusters as described above for the service A and the first group 220 of server clusters.

Consequently, there may be a first A-group associated with the first group of server clusters and another first A-group associated with the second group 2 of wavelengths.

Figure 2B:
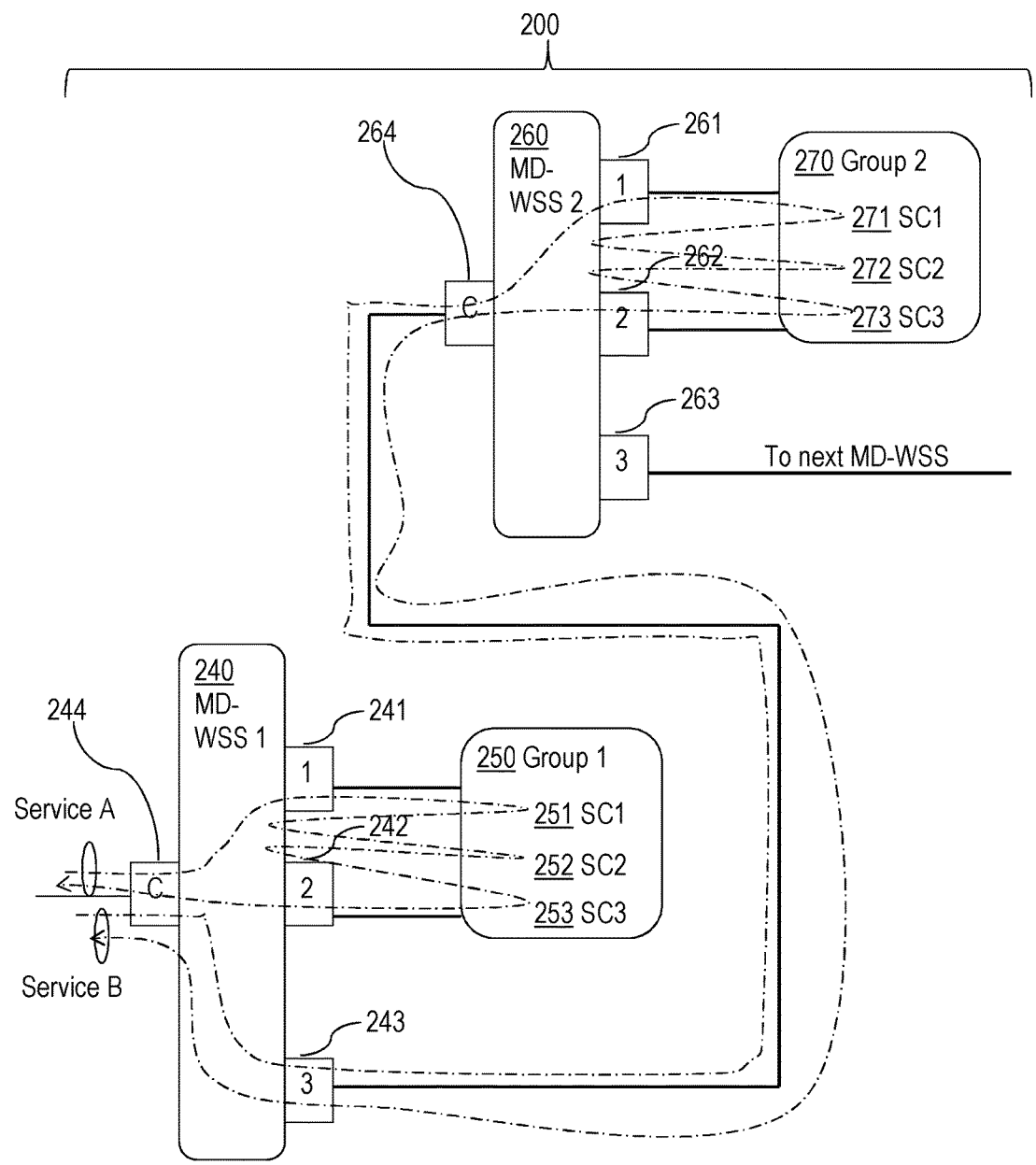
FIG. 2b is an illustration of a datacentre and the architecture thereof according to still an exemplifying embodiment.

According to an embodiment, illustrated in FIG. 2b, the datacentre 200 comprises at least two groups 250, 270 of server clusters 251-253, 271-273 and at least two MD-WSSs 240, 260, wherein at least one group 250 of server clusters is connected to a first MD-WSS 240 and at least one group 270 of server clusters are connected to a second MD-WSS 260 wherein a bypass tributary port 243 of the first MD-WSS is coupled to a common port 264 of the second MD-WSS 260.

FIG. 2b illustrates the datacentre 200 comprising two MD-WSSs 240 and 260, wherein the first group 250 of server clusters 251-253 is coupled to the first MD-WSS 240 by means of a first and second tributary port 241 and 242. The first MD-WSS 240 operates together with the first group 250 of server clusters in the same manner as having been described above. The first MD-WSS 240 is coupled to the second MD-WSS 260 by means of the third tributary port 243 of the first MD-WSS 240 and the common port 264 of the second MD-WSS 260.

Reverting to the example of FIG. 2a with respect to service A and service B, service A of the example in FIG. 2a corresponds to the example in FIG. 2b. However, for service B, the initial optical signal associated with the service, or service request, is still received on the common port of the first MD-WSS 240 but outputted on the third tributary port towards the second MD-WSS 260. In other words, the first MD-WSS 240 is configured to output the part of the received initial optical signal associated with the service, or service request, comprising wavelength(s) of the first A-group for the second group 270 of server clusters 271-273 in its tributary port for wavelengths of the first A-group for the second group 270 of server clusters 271-273.

The signal is then received by the second MD-WSS 260 on its common port 264, wherein the second MD-WSS 260 is configured to output the signal on its output tributary port 261 for wavelengths of the first A-group for the second group 270 of server clusters 271-273. Service B is then executed by the second group 270 of server clusters 271-273 in the same manner as described above. When service B is completed, the transceiver of the server cluster that completed the service is configured to output a signal having a wavelength, or wavelengths, of a second A-group of wavelengths for the second group 270 of server clusters towards the second MD-WSS 260. The second MD-WSS 260 is configured to receive the signal in the same manner as described above on its input tributary port for wavelengths of the second A-group and to output the signal on its common port towards the first MD-WSS 240. The first MD-WSS 240 is configured to receive the signal on its input tributary port for signals having wavelength(s) of the second A-group for the second group 270 of server clusters, being the same tributary port as for outputting wavelengths of the first A-group of wavelengths of the second group 270 of server clusters, i.e. the third tributary port 243.

The first MD-WSS 240 is further configured to output the received signal on its common port 244.

Still further, the first MD-WSS 240 is configured to receive a signal having a wavelength of a first A-group of a third group of server clusters (not shown) and to output the signal on the tributary port, which is coupled to the second MD-WSS 260. The second MD-WSS 260 is then further configured to output the received signal on an output tributary port for the corresponding wavelengths, e.g. towards a third MD-WSS of the datacentre, if such a third MD-WSS is comprised in the datacentre.

Further, the first MD-WSS 240 is configured to receive a signal having a wavelength of group B and to output the signal on a bypass tributary port, which in this example is the same tributary port that is coupled to the second MD-WSS 260. The second MD-WSS 260 is then further configured to output the received signal on an output tributary port for the corresponding wavelengths, e.g. towards a third MD-WSS of another datacentre.

Figure 2C:
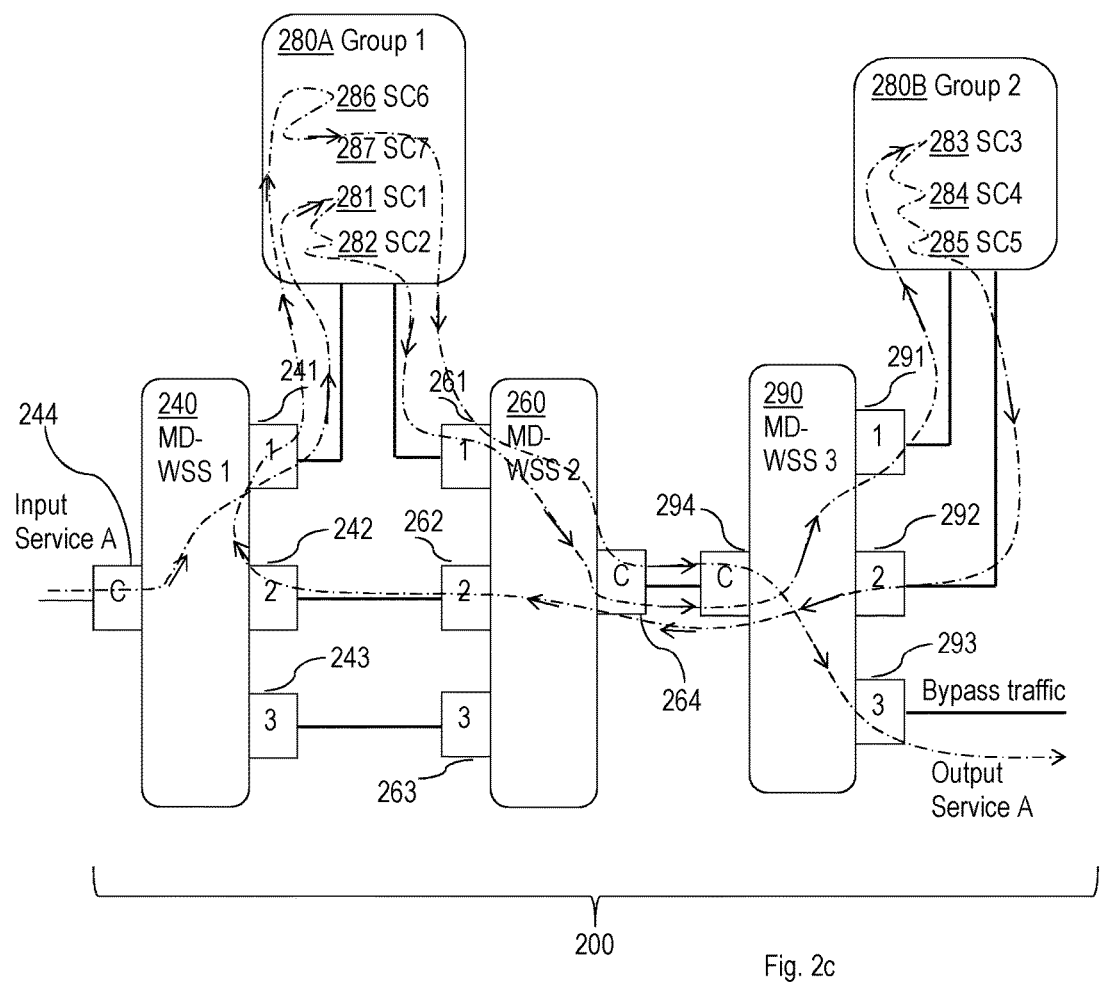
FIG. 2c is an illustration of a datacentre and the architecture thereof according to another exemplifying embodiment.

According to yet an embodiment, illustrated in FIG. 2c, the datacentre 200 comprises at least two groups 280A, 280B of server clusters 281-287 and at least three MD-WSSs 240, 260, 290, wherein a first group 280A of server clusters is coupled to an output tributary port of a first MD-WSS 240 and an input tributary port 261 of a second MD-WSS 260, wherein the first MD-WSS 240 and the second MD-WSS 260 further are coupled together by means of a respective tributary port 242, 262 of the first MD-WSS 240 and the second MD-WSS 260, wherein the second MD-WSS 260 further is coupled to a third MD-WSS 290 by means of their respective common ports 264, 294, wherein the second group 280B of server clusters is coupled to the third MD-WSS 290 by an output tributary port 291 and an input tributary port 292 of the third MD-WSS 290.

As can be seen in FIG. 2c, the possible several MD-WSS and groups of server clusters of the data centre may be arranged in various different ways. In the particular example illustrated in FIG. 2c, the first MD-WSS 240 is configured to receive the initial optical signal associated with the service, or service request on its common port 244. The received signal comprises a part having a wavelength of the first A-group of wavelengths, wherein the first MD-WSS 240 is configured to output the part of the signal having the wavelength of the first A-group of wavelengths on its output tributary port 241 for wavelengths of the first A-group of wavelengths towards the first group 280A of server clusters 281, 282, 286 and 287. In FIG. 2c, the server clusters are named in the order in which they all perform their part of the service.

The transceiver of the first server cluster 281 of the first group 280A of server clusters is configured to receive the signal having the wavelength of the first A-group of wavelengths from the first MD-WSS 240. The first server cluster 281 performs its part of the service, wherein its transceiver is configured to output a signal having a wavelength of a first group B of wavelengths since the service is not finished, the signal being outputted towards the second MD-WSS 260. The second MD-WSS 260 is then configured to receive the signal on its input tributary port for signals having a wavelength of the first group B and to output the received signal on its tributary port 262 for wavelengths of the first group B towards the first MD-WSS 240. The first and the second MD-WSS are coupled together by means of their respective second tributary port 242 and 262 respectively. Thus the first MD-WSS 240 receives the signal having the wavelength of the first group B and is configured to output the signal towards the first group 280A of server clusters on its output tributary port 241 for signals having a wavelength of the first B group, being the same tributary port as for signals having a wavelength of the first A group of wavelengths.

The transceiver of the second server cluster 282 is configured (e.g. by means of the previously described control unit) to receive the signal, wherein the second server cluster 282 is configured to process its part of the service, wherein the transceiver of the second server cluster 282 further is configured to output a signal of a second group B of wavelengths towards the second MD-WSS 260. The second MD-WSS is configured to receive the signal on its first tributary port 261, which is the tributary port coupled to the first group 280A of server clusters. Thus the first tributary port of the second MD-WSS 260 is configured to be an input tributary port for wavelengths of the first and the second group B of wavelengths. The second MD-WSS 260 is configured to output the received signal having the wavelength of the second group B on its common port towards the third MD-WSS 290.

The third MD-WSS 290 is configured to receive the signal from the second MD-WSS 260 by means of its common port 294 and to output the signal towards the second group 280B of server clusters on its output tributary port for wavelengths of the second group B, being the first tributary port 291 of the third MD-WSS 290.

The transceiver of the third server cluster 283 of the second group 280B of server clusters is configured to receive the signal, having the wavelength of the second group B, wherein the third is configured to perform its part of the service. The transceiver of the third server cluster 283 is further configured to output a signal having a wavelength of a third group B of wavelengths towards the third MD-WSS 290.

The third MD-WSS 290 is further configured to receive the signal on its input tributary port 292 for wavelengths of the second group B and to output the signal towards the second group 280B of server clusters on its first tributary port 291. The transceiver of the fourth server cluster 284 is configured to receive the signal in the same manner as the transceiver of the third server cluster 283. The fourth server cluster performs its part of the service and outputs a signal also having a wavelength of the second group B of wavelengths towards the third MD-WSS 290.

Then the third MD-WSS 290 receives and outputs the signal once more towards the second group 280B of server clusters, wherein the transceiver of the fifth server cluster 285 receives the signal, the fifth server cluster 285 performs its part of the service and the transceiver outputs a signal having a wavelength of the first group B, or a fourth group B, of wavelengths towards the MD-WSS 290.

The third MD-WSS 290 receives the signal having the wavelength of the first group B of wavelengths on its second tributary port 292 serving as an input tributary port also for signals having wavelengths of the first group B. The third MD-WSS 290 is configured to output the signal on its common port 294 towards the second MD-WSS 260, wherein the second MD-WSS 260 is configured to receive the signal on its common port 264.

The second MD-WSS 260 is configured to output the signal on its output tributary port 262 for wavelengths of the first group B of wavelengths towards the first MD-WSS 240. The first MD-WSS 240 is, as described above, configured to receive signals having a wavelength of the first group B from the second MD-WSS 260 on its second tributary port 242 serving as an input tributary port for wavelengths of the first group B of wavelengths.

The first MD-WSS 240 is configured, as described above, to output such signals on its first tributary port towards the first group 280A of server clusters. The transceiver of the sixth server cluster 286 is configured to receive the signal, wherein the sixth server cluster 286 is configured to process its part of the service, wherein the transceiver of the sixth server cluster 286 is further configured to output a signal of the first group B of wavelengths towards the second MD-WSS 260.

The second MD-WSS 260 is configured to receive the signal and to output the signal towards the first MD-WSS 240 in the same manner as described above. Likewise, the first MD-WSS 240 is configured to receive and output the signal towards the first group 280A of server clusters.

The transceiver of the seventh server cluster 287 is configured to receive the signal, wherein the seventh server cluster 287 is configured to process its part of the service, thereby completing the service, wherein the transceiver of the seventh server cluster 287 is configured to output a signal of the second A-group of wavelengths towards the second MD-WSS 260.

The second MD-WSS 260 is configured to receive the signal having the wavelength of the second A-group in its first tributary port, serving as an input tributary port also for wavelengths of the second A-group. The second MD-WSS 260 is further configured to output the signal on its common port towards the third MD-WSS 290, wherein the third MD-WSS 290 is configured to receive the signal on its common port and to output the signal having a wavelength of the second A-group on an output tributary port for wavelengths of the second A-group, being the same tributary port as used for bypass traffic, which tributary port is not coupled to the second group 280B of server clusters.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A datacentre configured for receiving an optical signal comprising groups of wavelength bands, A1, A2, A3, . . . , AX, and B, X being an integer, the signal being associated with a request for a service to be executed by the datacentre, the datacentre being configured for executing the service and outputting the result of the service, the datacentre comprising:
    at least one 1:N Multi Directional Wavelength Selective Switch, MD-WSS, having one common port and N tributary ports, where N is an integer and N>1, and
    a group of at least one server cluster, each comprising a respective transceiver configured to receive and transmit signals on at least some of the wavelength bands,
    wherein the at least one MD-WSS is configured to receive the signal associated with the service on its common port and to output a part of the signal that comprises a first A-group of wavelengths, i.e. one of A1, A2, A3, etc., on an output tributary port for wavelengths of the first A-group towards the group of server clusters,
    wherein the transceiver of one of the server clusters is configured to receive the signal from the at least one MD-WSS, the server cluster being configured to perform at least a part of the requested service, wherein the transceiver is further configured to output a signal towards one of the at least one MD-WSS, the signal outputted from the transceiver having a wavelength of group B of wavelengths when at least one part of the service remains to be executed before the service is fully executed, and the signal outputted from the transceiver having a wavelength of a second A-group of wavelengths, i.e. one of A1, A2, A3, etc., when the service is fully executed, wherein the first and the second A-group of wavelengths are different wherein one of the at least one MD-WSS is configured to receive the signal from the transceiver on an input tributary port for wavelengths of the second A-group and group B, and to
    (i) when the signal has a wavelength of the group B: output the signal on an output tributary port for wavelengths of group B towards the server clusters, the output tributary port for wavelengths of group B being the same as the output tributary port for wavelengths of the first A-group and to
    (ii) when the signal has the wavelength of second A-group: output the signal on the common port.

2. The datacentre according to claim 1, further comprising a first splitter-coupler, SPCL, having an input/output coupled to the output tributary port for wavelengths of the first A-group and group B of the at least one MD-WSS and at least one output/input per server clusters coupled to respective transceiver of the server clusters.

3. The datacentre according to claim 1, further comprising a second splitter-coupler, SPLC, having at least one output/input per server clusters, each respective output/input coupled to respective transceiver of the server clusters and an input/output coupled to the input tributary port for wavelengths of the second A-group and group B of one of the at least one MD-WSS.

4. The datacentre according to claim 1, wherein N>2, wherein the at least one MD-WSS is configured to output a part of the signal received on the common port, the part of the signal comprising a wavelength of group B, on a bypass tributary port, not being the input tributary port or the output tributary port for wavelengths of group AX, X being an integer.

5. The datacentre according to claim 4, wherein the datacentre comprises at least two MD-WSSs, wherein a second MD-WSS(s) is configured to (a) receive the signal comprising the wavelength of group B on its bypass tributary port and output the signal received on its common port, or (b) receive the signal comprising the wavelength of group B on its common port and output the signal on its bypass tributary port.

6. The datacentre according to claim 1, further comprising at least one optical amplifier coupled to the common port, or to one of the tributary ports of the MD-WSS, the tributary port being coupled directly or indirectly to the transceiver of respective server cluster(s).

7. The datacentre according to claim 1, wherein the number of MD-WSSs are two, a first MD-WSS and a second MD-WSS, wherein the first MD-WSS is configured to receive the signal associated with the service on its common port, the signal comprising a part having a wavelength of the first A-group, and to output the part of the signal having the wavelength of the first A-group on its output tributary port for wavelengths of the first A-group of the first MD-WSS, wherein the output tributary port for wavelengths of the first A-group of the first MD-WSS is coupled to the respective transceiver of the server cluster(s), wherein the respective transceiver of the server cluster(s) further is coupled to an input tributary port for wavelengths of the second A-group and group B of the second MD-WSS, wherein the two MD-WSSs are interconnected by means of the output tributary port for wavelengths of group B of the second MD-WSS and the input tributary port for B wavelengths of the first MD-WSS.

8. The datacentre according to claim 1, wherein the number of MD-WSSs are two, a first MD-WSS and a second MD-WSS, wherein the second MD-WSS is configured to receive the signal associated with the service on its common port, the signal comprising a part having a wavelength of the first A-group, and to output the part of the signal having the wavelength of the first A-group on its output tributary port for wavelengths of the first A-group of the second MD-WSS, wherein the output tributary port for the first A-group wavelengths of the second MD-WSS is coupled to the respective transceiver of the server cluster(s) and the input tributary port for wavelengths of the second A-group and group B of the first MD-WSS is coupled to the respective transceiver of the server cluster(s), wherein the two MD-WSSs are interconnected by means of the output tributary port for wavelengths of group B of the first MD-WSS and the input tributary port for wavelengths of group B of the second MD-WSS.

9. The datacentre according to claim 7, wherein the first MD-WSS is configured to receive the signal associated with the service on its common port, the signal comprising a wavelength of the first A-group, the first MD-WSS being configured to output the part of the signal comprising wavelengths of the first A-group on the output tributary port for the first A-group wavelengths towards the server clusters, wherein the transceiver of one of the server clusters is configured to receive the signal and to, once the server clusters has performed at least a part of the requested service, output a signal towards the second MD-WSS, the signal outputted from the transceiver having a wavelength of group B of wavelengths when at least one part of the service remains to be executed before the service is fully executed, and the signal outputted from the transceiver having a wavelength of the second A-group or a fourth A-group of wavelengths when the service is fully executed, wherein the second MD-WSS is configured to receive the signal comprising a wavelength of the second A-group, the fourth A-group or group B on its input tributary port for wavelengths of the second and fourth A-group or group B, and to (I) when the wavelength of the signal is of the second A-group: output the signal on its common port, or (II) when the wavelength of the signal is of the fourth A-group or group B: output the signal on its output tributary port for wavelengths of the fourth A-group and group B towards the first MD-WSS, wherein the first MD-WSS is configured to receive the signal on it input tributary port for wavelengths of the fourth A-group and group B, and (III) when the signal comprises a wavelength of the fourth A-group: output the signal on its common port, or (IV) when the signal comprises a wavelength of group B: output the signal on its output tributary port for wavelengths of the first A-group and group B towards the server clusters.

10. The datacentre according to claim 7, wherein the second MD-WSS is configured to receive the signal associated with the requested service on its common port, the signal comprising a wavelength of a third A-group, the second MD-WSS further being configured to output the part of the signal comprising a wavelength of the third A-group on its output tributary port for wavelengths of the third A-group towards the server clusters wherein the transceiver of one of the server clusters is configured to receive the signal and to, once the server cluster has performed at least a part of the requested service, output a signal towards one of the first MD-WSS, the signal outputted from the transceiver having a wavelength of group B when at least one part of the service remains to be executed before the service is fully executed, and the signal outputted from the transceiver having a wavelength of a fifth A-group when the service is fully executed, wherein the first MD-WSS is configured to receive the signal comprising a wavelength of the fifth A-group or group B on its input tributary port for wavelength of the fifth A-group and group B and to output wavelengths of the fifth A-group on its common port and to output wavelengths of group B on the output tributary port for wavelengths of group B towards the second MD-WSS, wherein the second MD-WSS is configured to receive the signal comprising a wavelength of group B on its input tributary port for wavelengths of group B and to output the signal on its output tributary port for wavelengths of group B, the output tributary port for wavelengths of group B being the same as the output tributary port for wavelengths of the third A-group towards the server clusters.

11. The datacentre according to claim 7, wherein the second MD-WSS is configured to receive the signal associated with the requested service on its common port, the signal comprising a wavelength of the third A-group, the second MD-WSS further being configured to output the part of the signal comprising a wavelength of the third A-group on its output tributary port for wavelengths of the third A-group towards the first MD-WSS, wherein the first MD-WSS is configured to receive the signal comprising a wavelength of the third A-group on its input tributary port for wavelengths of the third A-group and to output the signal on its output tributary port for wavelengths of the third A-group towards the server clusters, wherein the transceiver of one of the server clusters is configured to receive the signal and to, once the server cluster has performed at least a part of the requested service, output a signal towards the second MD-WSS, the signal outputted from the transceiver having a wavelength of group B when at least one part of the service remains to be executed before the service is fully executed, and the signal outputted from the transceiver having a wavelength of the fifth A-group when the service is fully executed, wherein the second MD-WSS is configured to receive the signal on its input tributary port for wavelengths of the fifth A-group A5 and group B, and to output parts of the signal comprising wavelength(s) of the fifth A-group on its common port and parts of the signals comprising wavelength(s) of group B on its output tributary port for wavelengths of group B.

12. The datacentre according to claim 1, wherein the datacentre comprises at least two groups of server clusters, wherein the at least one MD-WSS has at least twice as many tributary ports as there are groups of server clusters connected to it, wherein a pair of tributary ports comprising an input tributary port and an output tributary port are coupled to each group of server clusters, wherein the internal relationship between each pair of tributary ports and the common port corresponds to the relationship between the input and the out tributary port and the common port.

13. The datacentre according to claim 1, wherein the datacentre comprises at least two groups of server clusters and at least two MD-WSSs, wherein at least one group of server clusters is connected to a first MD-WSS and at least one group of server clusters are connected to a second MD-WSS wherein a bypass tributary port of the first MD-WSS is coupled to a common port of the second MD-WSS.

14. The datacentre according to claim 1, wherein the datacentre comprises at least two groups of server clusters and at least three MD-WSSs, wherein a first group of server clusters is coupled to an output tributary port of a first MD-WSS and an input tributary port of a second MD-WSS, wherein the first MD-WSS and the second MD-WSS further are coupled together by means of a respective tributary port of the first MD-WSS and the second MD-WSS, wherein the second MD-WSS further is coupled to a third MD-WSS by means of their respective common ports, wherein the second group of server clusters is coupled to the third MD-WSS by an output tributary port and an input tributary port of the third MD-WSS.

* * * * *